US012673853B2

(12) United States Patent
Shirai et al.

(10) Patent No.: US 12,673,853 B2
(45) Date of Patent: Jul. 7, 2026

(54) WORK MACHINE AND ABNORMALITY DETECTION FOR PIN POSITION DETECTION DEVICE

(71) Applicant: TADANO LTD., Kagawa (JP)

(72) Inventors: Manato Shirai, Kagawa (JP); Masahide Zushi, Kagawa (JP); Tsukasa Fujimoto, Kagawa (JP)

(73) Assignee: TADANO LTD., Kagawa (JP)

( * ) Notice: Subject to any disclaimer, the term of this patent is extended or adjusted under 35 U.S.C. 154(b) by 169 days.

(21) Appl. No.: 18/700,735

(22) PCT Filed: Oct. 25, 2022

(86) PCT No.: PCT/JP2022/039772
§ 371 (c)(1),
(2) Date: Apr. 12, 2024

(87) PCT Pub. No.: WO2023/074700
PCT Pub. Date: May 4, 2023

(65) Prior Publication Data

US 2025/0002307 A1 Jan. 2, 2025

(30) Foreign Application Priority Data

Oct. 29, 2021 (JP) ................................ 2021-178083
Jun. 17, 2022 (JP) ................................ 2022-098410

(51) Int. Cl.
*B66C 23/70* (2006.01)
*B66C 15/06* (2006.01)

(52) U.S. Cl.
CPC ........... *B66C 23/705* (2013.01); *B66C 15/06* (2013.01)

(58) Field of Classification Search
CPC ... B66C 23/701; B66C 23/702; B66C 23/703; B66C 23/705; B66C 23/706; B66C 23/707; B66C 23/708; B66C 15/06; B66C 23/88
(Continued)

(56) References Cited

U.S. PATENT DOCUMENTS

2010/0187194 A1* 7/2010 Schuermann ......... B66C 23/708 212/292
2014/0277969 A1* 9/2014 Morath .................. B66C 13/16 701/50
(Continued)

FOREIGN PATENT DOCUMENTS

JP 2012-096928 A 5/2012
JP 2013234026 A * 11/2013 ........... B66C 23/708
(Continued)

OTHER PUBLICATIONS

"Rotary position sensor Type DST X510", Feb. 2021, Danfoss, pp. 1-9 (Year: 2021).*
(Continued)

*Primary Examiner* — Erin M Piateski
*Assistant Examiner* — Ashley Tiffany Schoech
(74) *Attorney, Agent, or Firm* — Paratus Law Group, PLLC

(57) ABSTRACT

This work machine comprises: a first pin transitioning between an in-state where the boom and the telescopic cylinder are connected and an out-state where the connection is released; a second pin transitioning between an in state where booms are connected and an out-state where the connection is released; a main-detection device and a sub-detection device detecting the states of the first pin and the second pin; and a control unit that controls the boom based on the detection results of the main-detection device. The
(Continued)

control unit controls the ON/OFF of a first flag indicating whether or not the main-detection device detected the combination and the ON/OFF of a second flag indicating whether or not the sub-detection device detected the combination, and detects that an abnormality has occurred in the main-detection device and sub-detection device based on the first flag and the second flag.

10 Claims, 13 Drawing Sheets

(58) Field of Classification Search
USPC ... 701/50, 29.1, 32.8, 29.7, 29.8, 30.3, 30.5, 701/31.1, 30.7
See application file for complete search history.

(56) References Cited

U.S. PATENT DOCUMENTS

2020/0399100 A1 12/2020 Schoonmaker
2021/0039924 A1 2/2021 Zushi et al.
2021/0403013 A1* 12/2021 Jung ...................... B60K 28/10

FOREIGN PATENT DOCUMENTS

JP 2021-008361 A 1/2021
WO WO 2019/159993 A1 8/2019

OTHER PUBLICATIONS

S. Hart, "Types Of Proximity Sensors Used In Industrial Automation", May 4, 2019, SkylerH Automation, https://skylerh.com/proximity-sensor-types-used-in-industrial-automation/ (Year: 2019).*
"Position Sensors", Jun. 16, 2021, Honeywell, pp. 1-20 (Year: 2021).*
"Hall effect sensor", Sep. 20, 2020, Wikipedia, https://en.wikipedia.org/wiki/Hall_effect_sensor (Year: 2020).*
Jan. 10, 2023, International Search Report issued for related PCT Application No. PCT/JP2022/039772.
Jan. 10, 2023, International Search Opinion issued for related PCT Application No. PCT/JP2022/039772.

* cited by examiner

FIG. 15

| | | | | | | |
|---|---|---|---|---|---|---|
| | BOOM CONNECTING PIN | IN | IN | IN | ↔ | OUT |
| | CYLINDER CONNECTING PIN | OUT | ↔ | IN | IN | IN |
| MAIN DETECTION DEVICE | POTENTIOMETER | FIRST VOLTAGE VALUE | ↔ | NEUTRAL VOLTAGE VALUE | ↔ | SECOND VOLTAGE VALUE |
| SUB-DETECTION DEVICE | FIRST SENSOR | ON | ON | ON | OFF | OFF |
| | SECOND SENSOR | OFF | OFF | ON | ON | ON |
| | THIRD SENSOR | ON | OFF | OFF | OFF | ON |
| COMBINATION NO. | | 1 (THIRD SET) | 2 | 3 (FIRST SET) | 4 | 5 (SECOND SET) |
| CHECK FLAG NO. | | 1 | — | 3 | — | 5 |

WORK MACHINE AND ABNORMALITY DETECTION FOR PIN POSITION DETECTION DEVICE

CROSS REFERENCE TO PRIOR APPLICATION

This application is a National Stage Patent Application of PCT International Patent Application No. PCT/JP2022/039772 (filed on Oct. 25, 2022) under 35 U.S.C. § 371, which claims priority to Japanese Patent Application Nos. 2021-178083 (filed on Oct. 29, 2021) and 2022-098410 (filed on Jun. 17, 2022), which are all hereby incorporated by reference in their entirety.

TECHNICAL FIELD

The present invention relates to a work machine including a telescopic boom.

BACKGROUND ART

A mobile crane including a telescopic boom having a plurality of booms and a hydraulic actuator for expanding the telescopic boom is disclosed (see Patent Literature 1).

The adjacent booms are connected by a boom connecting pin. The boom (hereinafter, the boom is referred to as a movable boom) released from the connection by the boom connecting pin is movable with respect to another boom.

The actuator includes a rod member and a cylinder member. The cylinder member is releasably connected to the movable boom by a cylinder connecting pin. When the cylinder member is displaced in the telescoping direction in a state of being connected to the movable boom, the movable boom moves together with the cylinder member. Then, the telescopic boom telescopes.

In addition, in the crane as described above, in order to accurately control the telescopic movement of the telescopic boom, a technique of providing a position detection device that detects the positions of the boom connecting pin and the cylinder connecting pin is known. Such a crane controls the telescopic movement of the telescopic boom on the basis of the detection result of the position detection device.

CITATION LIST

Patent Literature

Patent Literature 1: JP 2012-96928 A

SUMMARY OF THE INVENTION

Problems to be Solved by the Invention

Incidentally, in the case of the crane including the position detection device as described above, when an abnormality has occurred in the position detection device, normal telescopic movement cannot be performed. For this reason, a technique capable of detecting an abnormality of the position detection device is required.

An object of the present invention is to provide a work machine capable of detecting an abnormality of a device that detects a position of a connecting pin.

Solutions to Problems

One aspect of a work machine according to the present invention is a work machine including: a plurality of booms that are telescoped with telescopic cylinders; a first pin capable of transitioning between an in-state in which the boom and the telescopic cylinder are connected and an out-state in which the connection is released;

a second pin capable of transitioning between an in-state in which the adjacent booms are connected and an out-state in which the connection is released; a main-detection device and a sub-detection device that are able to detect a combination of the states of the first pin and the second pin; and a control unit that controls a telescopic movement of the boom on the basis of a detection result of the main-detection device, wherein the control unit controls ON/OFF of a first flag indicating whether or not the main-detection device was able to detect the combination of the states of the first pin and the second pin and ON/OFF of a second flag indicating whether or not the sub-detection device was able to detect the combination of the states of the first pin and the second pin during the telescopic movement of the boom and detects that an abnormality has occurred in the main-detection device and the sub-detection device on the basis of the first flag and the second flag.

Effects of the Invention

According to the present invention, it is possible to provide a work machine capable of detecting an abnormality of a device that detects a position of a connecting pin.

BRIEF DESCRIPTION OF DRAWINGS

FIG. 15 is a view illustrating a relationship between states of the boom connecting pin and the cylinder connecting pin and a check flag.

DESCRIPTION OF EMBODIMENTS

Figure 1:
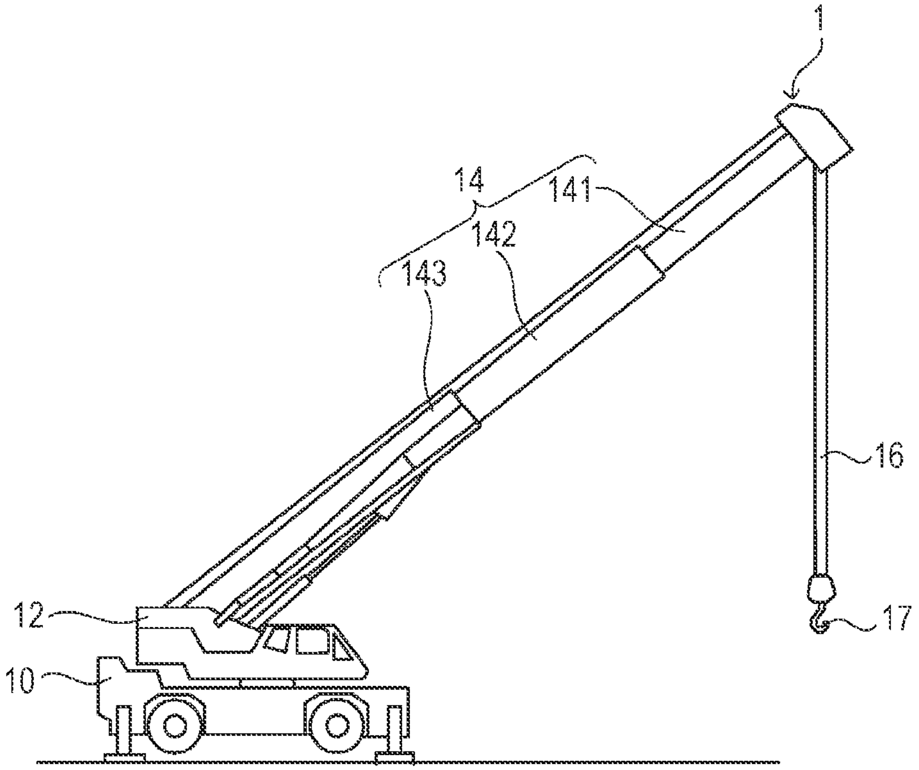
FIG. 1 is a schematic view of a mobile crane according to an embodiment.

Hereinafter, an example of an embodiment of the present invention will be described in detail with reference to the drawings. Further, the present invention is not limited to the embodiments described later.

EMBODIMENT

An outline of a mobile crane 1 according to this embodiment will be described with reference to FIGS. 1 and 2A to 2E.

The mobile crane is, for example, a rough terrain crane, an all-terrain crane, a truck crane, or a truck loader crane. However, the work machine is not limited to the mobile crane, and may be various work machines (for example, a high-place work vehicle) including a telescopic boom.

The mobile crane 1 includes a telescopic boom 14 and an actuator 2. The telescopic boom 14 includes a plurality of telescopically combined booms. The adjacent booms are connected by a boom connecting pin (boom connecting pins 144*a* and 144*b*).

The actuator 2 moves the boom in the telescoping direction when telescoping the telescopic boom 14. At this time, the actuator 2 is connected to the boom to be moved via cylinder connecting pins 454A and 454B, and releases the connection between the boom to be moved and the boom adjacent to the boom to be moved.

In the telescopic movement of the telescopic boom 14, the cylinder connecting pin and the boom connecting pin are moved by the power of an electric motor 41. In order to control the telescopic movement of the telescopic boom, position information of the cylinder connecting pin and the boom connecting pin is required.

Therefore, in the case of this embodiment, a position information detection device 5 for detecting the position information of the cylinder connecting pin and the boom connecting pin is provided. In particular, the position information detection device 5 includes two systems of detection devices (a first detection device 51 and a second detection device 52 to be described later).

Such a position information detection device 5 is configured to be able to detect a combination of the states of the cylinder connecting pin and the boom connecting pin.

The mobile crane 1 of this embodiment has a function of detecting an abnormality in the position information detection device 5. In particular, the mobile crane 1 of this embodiment has a function of specifying which of the first detection device 51 and the second detection device 52 constituting the position information detection device 5 has an abnormality. Hereinafter, the mobile crane 1 according to this embodiment will be specifically described.

As illustrated in FIGS. 1 and 2A to 2E, the mobile crane 1 includes a traveling body 10, a turning table 12, the telescopic boom 14, the actuator 2, a wire rope 16, and a hook 17.

The turning table 12 is rotatably provided on the upper part of the traveling body 10. The proximal end of the telescopic boom 14 is fixed to the turning table 12, and can be raised and lowered and can be expanded and contracted. The actuator 2 telescopes the telescopic boom 14. The wire rope 16 is supported by the telescopic boom 14 and hangs down from a distal end of the telescopic boom 14. The hook 17 is provided at the tip of the wire rope 16.

Next, as illustrated in FIGS. 1 and 2A to 2E, the telescopic boom 14 has a plurality of booms combined in a telescopic manner. Specifically, the plurality of booms is, in order from the inside, a distal end boom 141, a middle boom 142, and a proximal end boom 143. Further, the distal end boom 141, the middle boom 142, and the proximal end boom 143 are also referred to as boom elements.

Figure 2C:
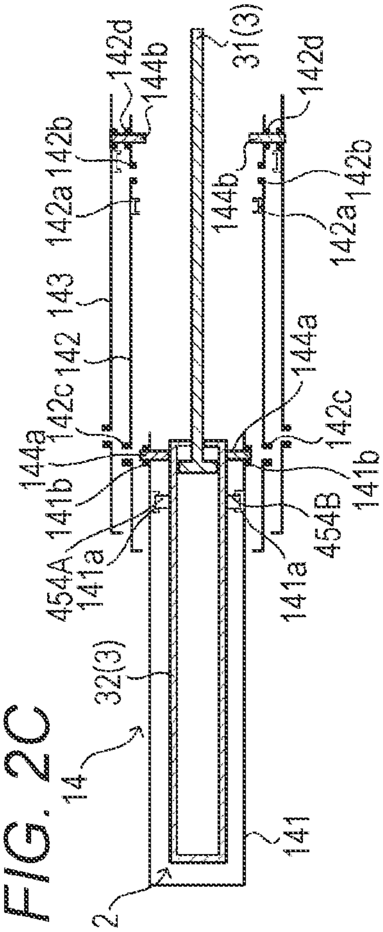
FIG. 2C is a schematic view for illustrating a structure and a telescopic movement of the telescopic boom.
Figure 2D:
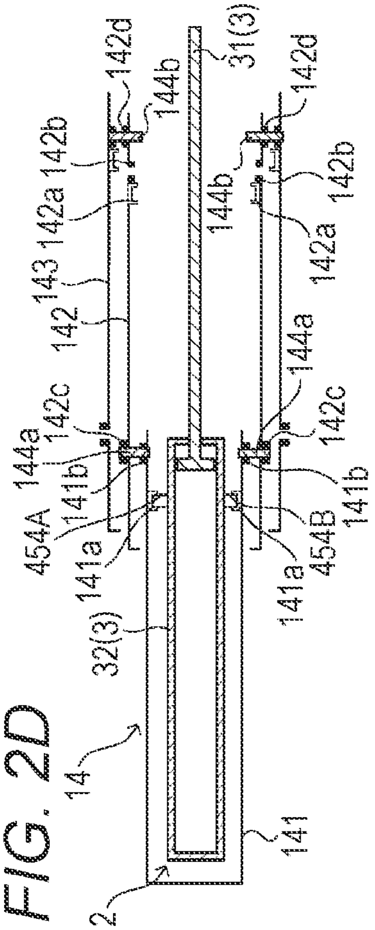
FIG. 2D is a schematic view for illustrating a structure and a telescopic movement of the telescopic boom.
Figure 2E:
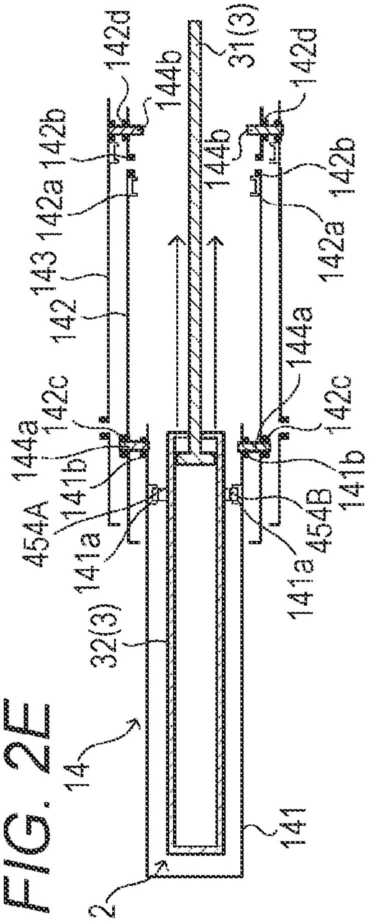
FIG. 2E is a schematic view for illustrating a structure and a telescopic movement of the telescopic boom.
Figure 2A:
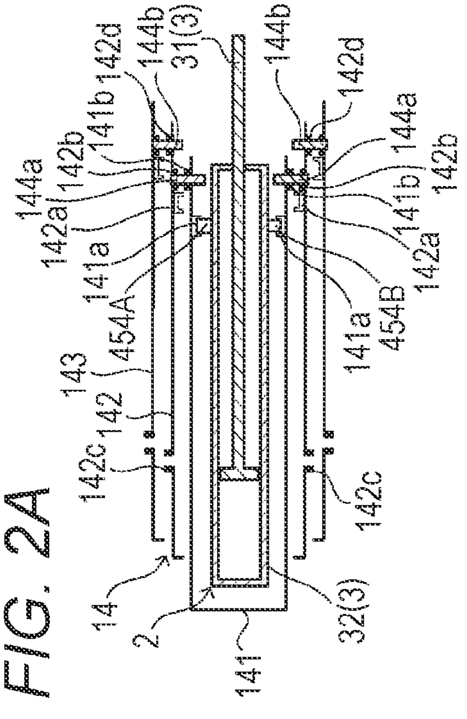
FIG. 2A is a schematic view for illustrating a structure and a telescopic movement of a telescopic boom.

The telescopic boom 14 sequentially expands from the boom disposed on the inner side, and transitions from the contracted state illustrated in FIG. 2A to the expanded state illustrated in FIG. 1. A plurality of middle booms may be provided. The distal end boom 141 has a cylindrical shape and has an internal space capable of accommodating the actuator 2. The distal end boom 141 has a pair of cylinder pin receiving portions 141*a* and a pair of boom pin receiving portions 141*b* at the proximal end.

The pair of cylinder pin receiving portions 141*a* is provided coaxially with each other at the proximal end of the distal end boom 141. Each of the pair of cylinder pin receiving portions 141*a* can be engaged with and disengaged from the pair of cylinder connecting pins 454A and 454B provided on a cylinder member 32 of a telescopic cylinder 3.

Each of the cylinder connecting pins 454A and 454B is biased outward (in a direction from proximal end to distal end of the cylinder connecting pins 454A and 454B) by a first biasing mechanism 455 to be described later. The cylinder connecting pins 454A and 454B move inward (in a direction from distal end to proximal end of cylinder connecting pins 454A and 454B) on the basis of the operation of a cylinder connecting mechanism 45 to be described later.

In a state where the pair of cylinder connecting pins 454A and 454B and the pair of cylinder pin receiving portions 141*a* are engaged with each other, the distal end boom 141 is movable in the telescoping direction together with the cylinder member 32. The pair of boom pin receiving portions 141*b* is provided coaxially with each other on the proximal end side of the cylinder pin receiving portion 141*a*. Each of the pair of boom pin receiving portions 141*b* supports the pair of boom connecting pins 144*a*.

Each of the pair of boom connecting pins 144*a* is biased outward (in a direction from the proximal end toward the distal end of the boom connecting pin 144*a*) by a second biasing mechanism 463 to be described later. Each of the pair of boom connecting pins 144*a* connects the distal end boom 141 and the middle boom 142. The pair of boom connecting pins 144*a* moves inward (in a direction from the distal end toward the proximal end of the boom connecting pin 144*a*) on the basis of an operation of a boom connecting mechanism 46 described later.

In a state where the distal end boom 141 and the middle boom 142 are connected by the pair of boom connecting pins 144*a*, the boom connecting pin 144*a* is inserted so as to bridge between the boom pin receiving portion 141*b* of the distal end boom 141 and the first boom pin receiving portion 142*b* or the second boom pin receiving portion 142*c* of the middle boom 142. That is, each of the pair of boom connecting pins 144*a* can be engaged with and disengaged from the first boom pin receiving portion 142*b* or the second boom pin receiving portion 142*c* of the middle boom 142.

When the distal end boom 141 and the middle boom 142 are connected, the distal end boom 141 is prohibited from moving with respect to the middle boom 142. On the other hand, when the distal end boom 141 and the middle boom 142 are not connected, the distal end boom 141 is movable with respect to the middle boom 142.

The middle boom 142 has a cylindrical shape and has an internal space capable of accommodating the distal end boom 141. The middle boom 142 has a pair of cylinder pin receiving portions 142*a*, a pair of first boom pin receiving portions 142*b*, and a pair of third boom pin receiving portions 142*d* at a proximal end, and a pair of second boom pin receiving portions 142*c* at a distal end.

The pair of cylinder pin receiving portions 142*a* and the pair of first boom pin receiving portions 142*b* are substantially similar to the pair of cylinder pin receiving portions 141*a* and the pair of boom pin receiving portions 141*b* of the distal end boom 141, respectively. The pair of third boom pin receiving portions 142*d* is provided coaxially with each other on the proximal end side of the pair of first boom pin receiving portions 142*b*. The pair of boom connecting pins 144*b* are inserted into the pair of third boom pin receiving portions 142*d*, respectively. The pair of boom connecting pins 144*b* connects the middle boom 142 and the proximal end boom 143.

The pair of second boom pin receiving portions 142*c* is provided coaxially with each other at the distal end of the middle boom 142. The pair of boom connecting pins 144*a* are inserted into the pair of second boom pin receiving portions 142*c*, respectively.

The actuator 2 is an actuator that telescopes the telescopic boom 14. As illustrated in FIGS. 2A to 11C, the actuator 2 includes the telescopic cylinder 3 and a pin moving mechanism 4. The actuator 2 is disposed in the internal space of the distal end boom 141 in the contracted state of the telescopic boom 14 (the state illustrated in FIGS. 2A to 2E).

The telescopic cylinder 3 includes a rod member 31 and a cylinder member 32. The telescopic cylinder 3 moves the boom connected to the cylinder member 32 via the cylinder connecting pins 454A and 454B described later.

<Pin Moving Mechanism>

The pin moving mechanism 4 includes the electric motor 41, a brake mechanism 42, a transmission mechanism 43, the cylinder connecting mechanism 45, the boom connecting mechanism 46, and the position information detection device 5 supported by a trunnion 40.

Hereinafter, each member constituting the actuator 2 will be described with reference to a state in which each member is incorporated in the actuator 2. In the description of the actuator 2, an orthogonal coordinate system (X, Y, Z) is used. In the orthogonal coordinate system, the X direction coincides with the telescoping direction of the telescopic boom 14 mounted on the mobile crane 1. The +X direction side is an expanding direction in the telescoping direction. The −X direction side is a contracting direction in the telescoping direction. When the turning angle of the telescopic boom 14 is 0° and the lifting angle of the telescopic boom 14 is 0° (fully collapsed state), the +X direction side coincides with the front side of the mobile crane 1. When the turning angle of the telescopic boom 14 is 0° and the lifting angle of the telescopic boom 14 is 0°, the −X direction side coincides with the rear side of the mobile crane 1.

Further, for example, the Z direction coincides with the up to down direction of the mobile crane 1 in a state where the lifting angle of the telescopic boom 14 is 0°. The Y direction coincides with, for example, the vehicle width direction (left to right direction) of the mobile crane 1 in a state where the telescopic boom 14 faces forward. Hereinafter, without otherwise specified, the width direction or the left to right direction means the Y direction in the orthogonal coordinate system (X, Y, Z).

When the mobile crane 1 is viewed from the rear to the front, the left side is the +Y direction side. When the mobile crane 1 is viewed from the rear to the front, the right side is the −Y direction side. When the mobile crane 1 is viewed from the rear to the front, the upper side is the +Z direction side. In addition, when the mobile crane 1 is viewed from the rear to the front, the lower side is the −Z direction side.

Figure 3:
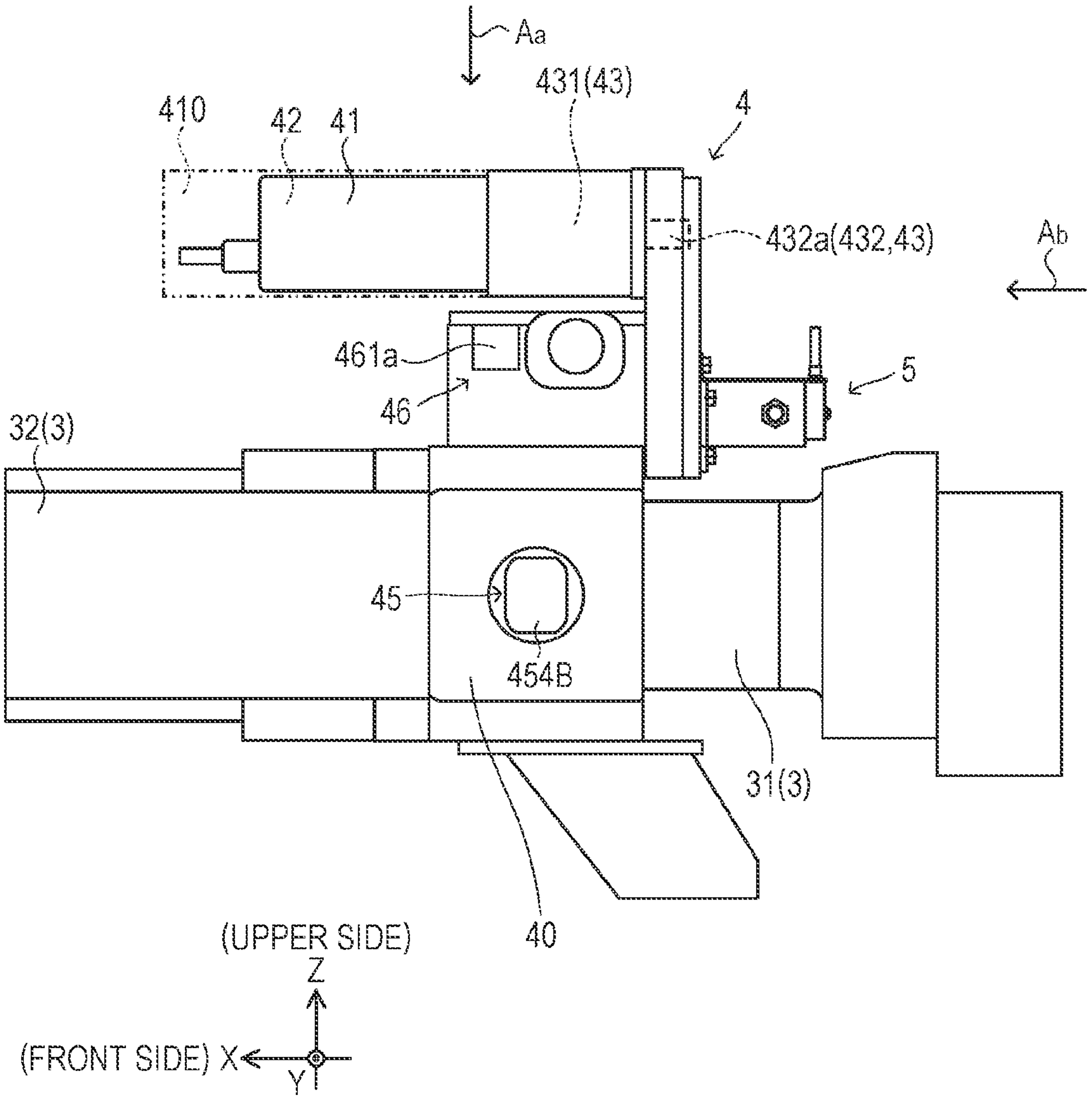
FIG. 3 is a side view of a pin moving module.
Figure 4:
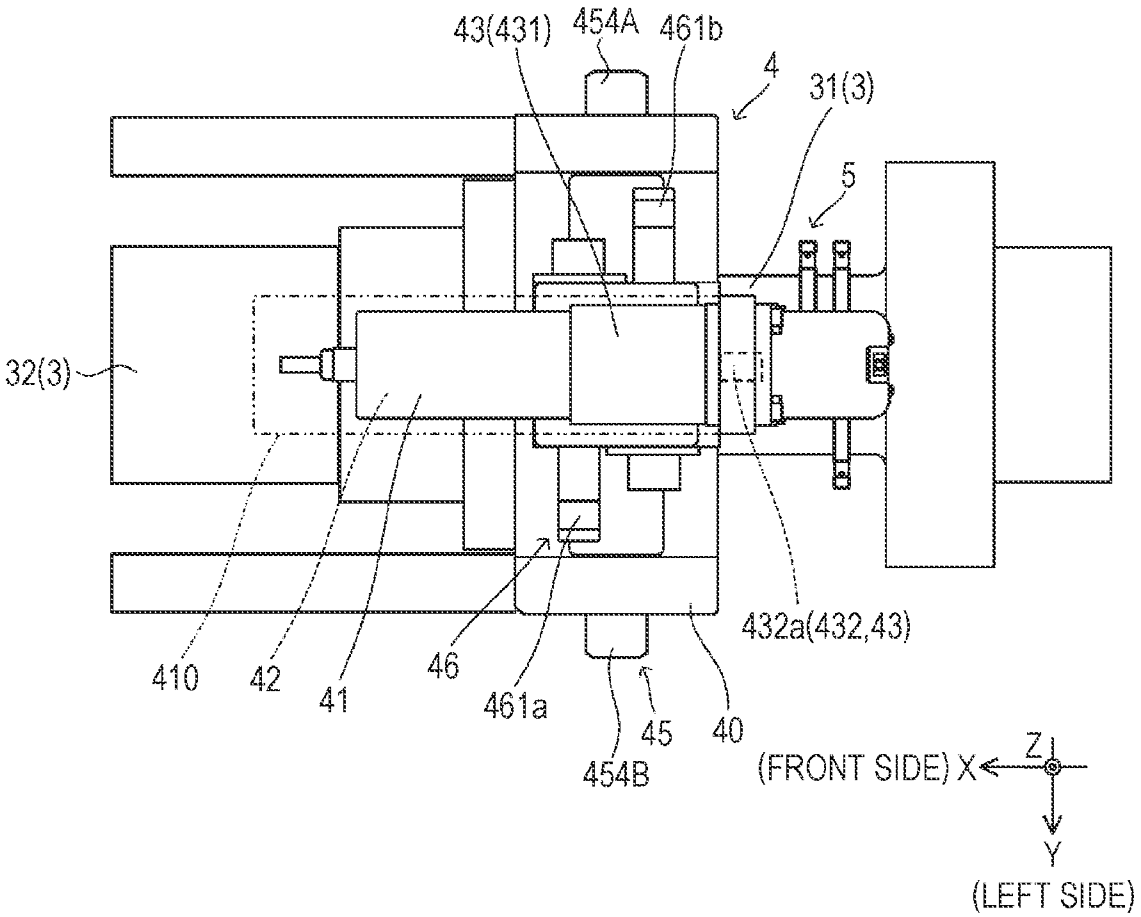
FIG. 4 is a view of the pin moving module as viewed from an arrow Aa in FIG. 3.
Figure 5:
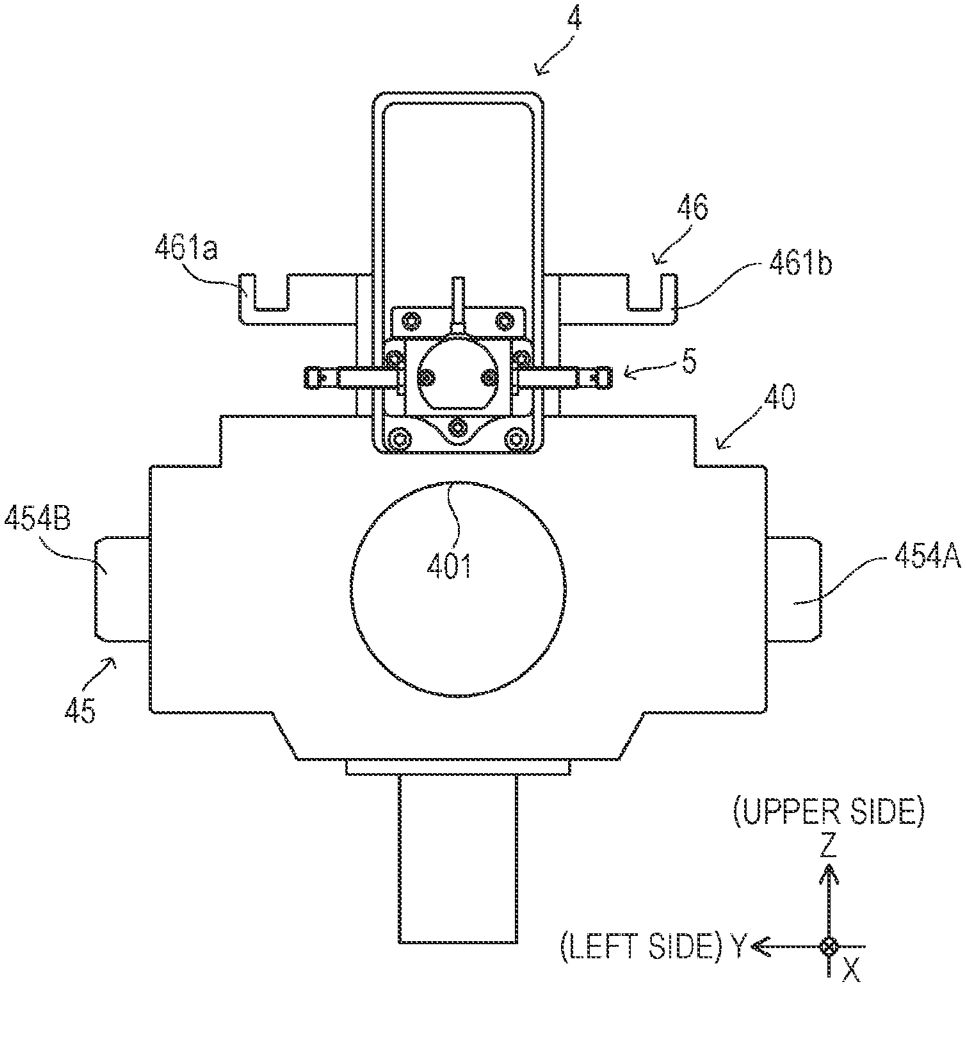
FIG. 5 is a view of the pin moving module as viewed from an arrow Ab in FIG. 3.

The trunnion 40 will be described with reference to FIGS. 3 to 5. The trunnion 40 has a support hole 401. The rod member 31 of the telescopic cylinder 3 is inserted into the support hole 401 in the X direction. The trunnion 40 is fixed to a proximal end (end on the −X direction side) of the cylinder member 32 of the telescopic cylinder 3. Therefore, the trunnion 40 moves together with the cylinder member 32.

The trunnion 40 supports the cylinder connecting mechanism 45 and the boom connecting mechanism 46. The trunnion 40 supports the electric motor 41, the brake mechanism 42, and the transmission mechanism 43 described later. In this manner, the trunnion 40 unitizes each of these elements. Such a configuration contributes to miniaturization of the pin moving mechanism 4, improvement of productivity, and improvement of system reliability.

The trunnion 40 holds the right cylinder connecting pin 454A by a right pin support portion (not illustrated) provided on the right wall portion. The right cylinder connecting pin 454A is movable in the left to right direction. The trunnion 40 holds the left cylinder connecting pin 454B by a left pin support portion (not illustrated) provided on the left wall portion wall. The left cylinder connecting pin 454B is movable in the left to right direction.

The electric motor 41 is fixed to a vertical transmission mechanism 432 via a speed reducer 431. Such an electric motor 41 is covered with a cover 410 for waterproofing and dustproofing. As illustrated in FIG. 3, the electric motor 41 is provided above the trunnion 40. The speed reducer 431 is connected to an output shaft of the electric motor 41 (see FIGS. 10A to 10C).

The electric motor 41 is connected to, for example, a power supply device (not illustrated) provided on the turning table 12 via a power supply cable. Furthermore, the electric motor 41 is connected to, for example, a control unit (not illustrated) provided on the turning table 12 via a control signal transmission cable.

The brake mechanism 42 applies a braking force to the electric motor 41. The brake mechanism 42 prevents the rotation of the output shaft of the electric motor 41 while the electric motor 41 is stopped. As a result, the state of the pin moving mechanism 4 is maintained in the stopped state of the electric motor 41.

Specifically, the brake mechanism 42 is operated in a reduced state of the cylinder connecting mechanism 45 or a reduced state of the boom connecting mechanism 46 described later to maintain the states of the cylinder connecting mechanism 45 and the boom connecting mechanism 46. The state of the brake mechanism 42 is switched by a control unit 530 (see FIGS. 10A to 11C). The state of the brake mechanism 42 may be switched on the basis of an operation of an operator.

The transmission mechanism 43 transmits the power of the electric motor 41 to the cylinder connecting mechanism 45 and the boom connecting mechanism 46. The transmission mechanism 43 includes the speed reducer 431 and the vertical transmission mechanism 432. The speed reducer 431 decelerates the rotation of the electric motor 41 and transmits the rotation to the vertical transmission mechanism 432. The vertical transmission mechanism 432 transmits the rotation of the speed reducer 431 to a switch gear 450 (FIGS. 10A to 10C) to be described later. In this embodiment, the electric motor 41 is provided above the switch gear 450. Therefore, the vertical transmission mechanism 432 is configured to transmit the rotation of the electric motor 41 to the switch gear 450 provided below the electric motor 41.

Specifically, the vertical transmission mechanism 432 includes an upper transmission shaft 432*a*, a lower transmission shaft 432*b*, and a transmission gear (not illustrated). The upper transmission shaft 432*a* is provided coaxially with the output shaft of the electric motor 41. The upper transmission shaft 432*a* is connected to the speed reducer 431.

The lower transmission shaft 432*b* corresponds to an example of a rotary member that rotates on the basis of the power of the motor, and is provided in parallel with the upper transmission shaft 432*a* and below the upper transmission shaft 432*a*. The lower transmission shaft 432*b* is disposed coaxially with the switch gear 450 to be described later, and is connected to the switch gear 450. The rotary member that rotates on the basis of the power of the motor is not limited to the lower transmission shaft 432*b*. The rotating member that rotates on the basis of the power of the motor may be any member that rotates on the basis of the power of the electric motor 41.

The transmission gear includes an upper gear (not illustrated) provided on the upper transmission shaft 432*a* and a lower gear (not illustrated) provided on the lower transmission shaft 432*b*. The upper gear and the lower gear are external gears, and are meshed with each other. The rotation of the speed reducer 431 is transmitted to the switch gear 450 via the vertical transmission mechanism 432.

<Cylinder Connecting Mechanism>

Figure 10A:
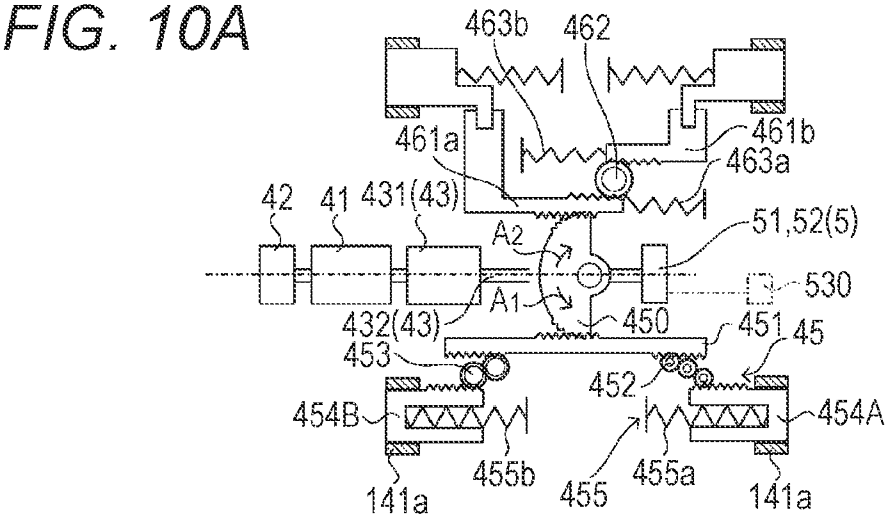
FIG. 10A is a schematic view for illustrating the operation of a cylinder connecting mechanism.
Figure 10B:
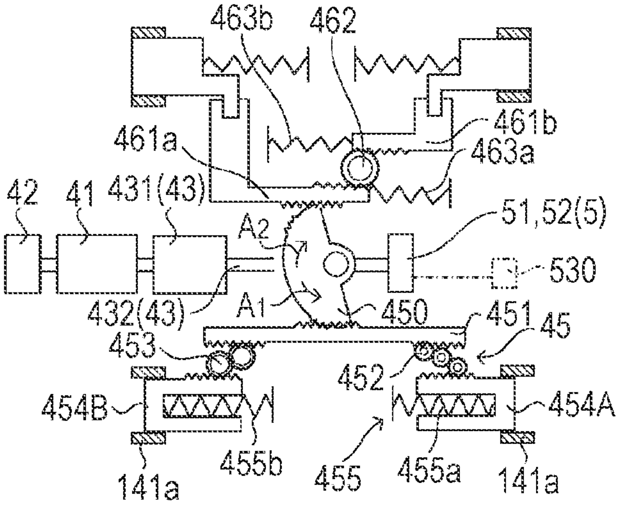
FIG. 10B is a schematic view for illustrating the operation of the cylinder connecting mechanism.
Figure 10C:
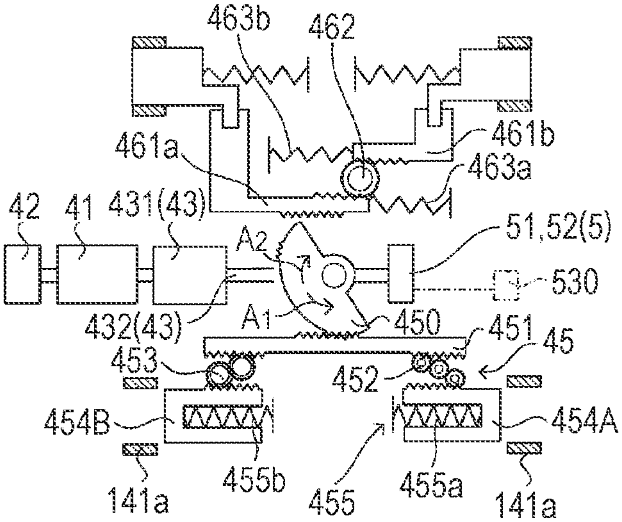
FIG. 10C is a schematic view for illustrating the operation of the cylinder connecting mechanism.

The cylinder connecting mechanism 45 is operated on the basis of the power of the electric motor 41, and transitions between the expanded state (see FIGS. 9 and 10A) and the contracted state (see FIG. 10C). The operation in which the cylinder connecting mechanism 45 transitions from the expanded state to the contracted state is a removing operation of the cylinder connecting mechanism 45. The operation in which the cylinder connecting mechanism 45 transitions from the contracted state to the expanded state is an inserting operation of the cylinder connecting mechanism 45.

In the expanded state of the cylinder connecting mechanism 45, the pair of cylinder connecting pins 454A and 454B to be described later and the pair of cylinder pin receiving portions 141*a* of the boom (for example, the distal end boom 141) are engaged with each other. In this engaged state, the boom and the cylinder member 32 are connected.

In the contracted state of the cylinder connecting mechanism 45, the pair of cylinder connecting pins 454A and 454B and the pair of cylinder pin receiving portions 141*a* are disengaged from each other. In this disengaged state, the engagement between the boom and the cylinder member 32 is released.

Specifically, the cylinder connecting mechanism 45 includes the switch gear 450, a first rack bar 451, a first gear mechanism 452, a second gear mechanism 453, the pair of cylinder connecting pins 454A and 454B, and the first biasing mechanism 455.

The switch gear 450 has a tooth portion on a part of the outer peripheral surface. The switch gear 450 is externally fitted and fixed to the lower transmission shaft 432*b* of the transmission mechanism 43, and rotates together with the lower transmission shaft 432*b*. The switch gear 450 selectively transmits the power of the electric motor 41 to any one of the cylinder connecting mechanism 45 and the boom connecting mechanism 46.

In the following description, the rotation direction of the switch gear 450 (in a direction indicated by an arrow $A_1$ in FIG. 10A) when the cylinder connecting mechanism 45 transitions from the expanded state to the contracted state is the first direction in the rotation direction of the switch gear 450. On the other hand, the rotation direction of the switch gear 450 (in a direction indicated by an arrow $A_2$ in FIG. 10A) when the cylinder connecting mechanism 45 transitions from the contracted state to the expanded state is the second direction in the rotation direction of the switch gear 450.

The first rack bar 451 moves in its longitudinal direction (Y direction) in accordance with the rotation of the switch gear 450. The first rack bar 451 is located on the most +Y direction side in the expanded state of the cylinder connecting mechanism 45. On the other hand, the first rack bar 451 is located on the most-Y direction side in the contracted state of the cylinder connecting mechanism 45.

The first rack bar 451 has a first rack tooth portion on its upper surface. The first rack tooth portion meshes with the tooth portion of the switch gear 450 only during the above-described state transition.

When the switch gear 450 rotates by a predetermined amount in the first direction in the expanded state, the tooth portion of the switch gear 450 meshes with the first rack tooth portion of the first rack bar 451. When the switch gear 450 further rotates in the first direction from this state, the first rack bar 451 moves rightward in accordance with the rotation of the switch gear 450.

When the switch gear 450 rotates in the second direction from the expanded state of the cylinder connecting mechanism 45, the first rack tooth portion of the first rack bar 451 and the tooth portion of the switch gear 450 do not mesh with each other.

The first rack bar 451 has a second rack tooth portion and a third rack tooth portion on the lower surface. The second rack tooth portion meshes with the first gear mechanism 452 described later. The third rack tooth portion meshes with the second gear mechanism 453 described later.

The first gear mechanism 452 has a plurality of gears (see FIG. 9) each of which is an external gear. The first gear mechanism 452 meshes with the second rack tooth portion of the first rack bar 451. The first gear mechanism 452 rotates in accordance with the movement of the first rack bar 451. In addition, the first gear mechanism 452 meshes with a pin side rack tooth portion of the right cylinder connecting pin 454A to be described later.

The second gear mechanism 453 has a plurality of gears (see FIG. 9) each of which is an external gear. The second gear mechanism 453 meshes with the third rack tooth portion of the first rack bar 451. The second gear mechanism 453 rotates in accordance with the movement of the first rack bar 451. The second gear mechanism 453 meshes with a pin side rack tooth portion of the left cylinder connecting pin 454B to be described later.

As illustrated in FIGS. 9 and 10A to 10C, the pair of cylinder connecting pins 454A and 454B have center axes coinciding with the left to right direction and coaxial with each other. Each of the pair of cylinder connecting pins 454A and 454B corresponds to an example of a first pin.

The right cylinder connecting pin 454A has a pin side rack tooth portion on the outer peripheral surface. The pin side rack tooth portion of the right cylinder connecting pin 454A meshes with the first gear mechanism 452. The left cylinder connecting pin 454B has a pin side rack tooth portion on the outer peripheral surface. The pin side rack tooth portion of the left cylinder connecting pin 454B meshes with the second gear mechanism 453.

The right cylinder connecting pin 454A having the above configuration is supported by the right wall portion of the trunnion 40. The movement of the right cylinder connecting pin 454A in the axial direction (left to right direction) is guided by the right wall portion of the trunnion 40.

The left cylinder connecting pin 454B is supported by the left wall portion of the trunnion 40. The movement of the left cylinder connecting pin 454B in the axial direction is guided by the left wall portion. The right cylinder connecting pin 454A moves in its own axial direction in accordance with the rotation of the first gear mechanism 452. Specifically, the right cylinder connecting pin 454A moves rightward (outward) when the cylinder connecting mechanism 45 transitions from the contracted state (see FIG. 10C) to the expanded state (see FIG. 10A). On the other hand, the right cylinder connecting pin 454A moves leftward (inward) when the cylinder connecting mechanism transitions from the expanded state (see FIG. 10A) to the contracted state (see FIG. 10C).

The left cylinder connecting pin 454B moves in its own axial direction in accordance with the rotation of the second gear mechanism 453. Specifically, the left cylinder connecting pin 454B moves leftward when the cylinder connecting mechanism 45 transitions from the contracted state (see FIG. 10C) to the expanded state (see FIG. 10A). On the other hand, the left cylinder connecting pin 454B moves rightward when the cylinder connecting mechanism transitions from the expanded state (see FIG. 10A) to the contracted state (see FIG. 10C).

When the cylinder connecting pins 454A and 454B move outward from the contracted state of the cylinder connecting pins 454A and 454B, the tip portions of the cylinder connecting pins 454A and 454B protrude outward from both side surfaces of the trunnion 40 in the left to right direction. The state in which the cylinder connecting pins 454A and 454B move to the outermost side is referred to as the expanded state of the cylinder connecting pins 454A and 454B. The cylinder connecting pins 454A and 454B are engaged with the cylinder pin receiving portion of the boom in the expanded state.

The first biasing mechanism 455 returns the cylinder connecting mechanism 45 to the expanded state when the electric motor 41 is in the non-energized state in the contracted state of the cylinder connecting mechanism 45. In other words, when the electric motor 41 is in the non-energized state (stopped state) and the brake mechanism 42 is in the OFF state in the contracted state of the cylinder connecting mechanism 45, the first biasing mechanism 455 returns the pair of cylinder connecting pins 454A and 454B to the reference positions.

Specifically, the first biasing mechanism 455 corresponds to an example of a first spring, and includes a pair of coil springs 455*a* and 455*b* (see FIGS. 10A to 10C). The right coil spring 455*a* constantly energizes the right cylinder connecting pin 454A. The direction in which the right coil spring 455*a* biases the cylinder connecting pin 454A coincides with the direction (right side) from the proximal end toward the distal end of the cylinder connecting pin 454A.

The left coil spring 455*b* constantly energizes the left cylinder connecting pin 454B. The direction in which the left coil spring 455*b* biases the left cylinder connecting pin 454B coincides with the direction (left side) from the proximal end toward the distal end of the cylinder connecting pin 454B. The configuration of the first biasing mechanism 455 as described above contributes to miniaturization of the pin moving mechanism 4. Further, the arrangement of the coil springs 455*a* and 455*b* is not limited to the arrangement of this embodiment. The operation of the cylinder connecting mechanism 45 will be described later.

<Boom Connecting Mechanism>

The boom connecting mechanism 46 transitions between the expanded state (see FIG. 11A) and the contracted state (see FIG. 11C) on the basis of the rotation of the electric motor 41. The operation in which the boom connecting mechanism 46 transitions from the expanded state to the contracted state is a removing operation of the boom connecting mechanism 46. The operation in which the boom connecting mechanism 46 transitions from the contracted state to the expanded state is an inserting operation of the boom connecting mechanism 46.

In the expanded state, the boom connecting mechanism 46 can take either an engaged state or a disengaged state with respect to the boom connecting pin (for example, the pair of boom connecting pins 144*a*). The boom connecting mechanism 46 disengages the boom connecting pin from the boom by transitioning from the expanded state to the contracted state while being engaged with the boom connecting pin. The boom connecting pin corresponds to an example of the second pin.

The boom connecting mechanism 46 engages the boom with the boom connecting pin by transitioning from the contracted state to the expanded state while being engaged with the boom connecting pin. As illustrated in FIGS. 9 and 11A to 11C, the boom connecting mechanism 46 includes the switch gear 450, a pair of second rack bars 461*a* and 461*b*, a synchronous gear 462, and the second biasing mechanism 463. The switch gear 450 is a gear common to the cylinder connecting mechanism 45.

Each of the pair of second rack bars 461*a* and 461*b* is, for example, a shaft member long in the left to right direction, and is disposed in parallel in a state of being disengaged in the front to rear direction. Each of the pair of second rack bars 461*a* and 461*b* is disposed above the first rack bar 451 of the cylinder connecting mechanism 45.

Each of the pair of second rack bars 461*a* and 461*b* has a synchronization rack tooth portion on the facing surface. Each of the synchronization rack tooth portion meshes with the synchronous gear 462 (see FIGS. 11A to 11C). When the synchronous gear 462 rotates, the second rack bar 461*a* on one side (front side) and the second rack bar 461*b* on the other side (rear side) move in opposite directions in the left to right direction.

Each of the pair of second rack bars 461*a* and 461*b* has locking claw portions 461*g* and 461*h* (see FIG. 9) at distal ends thereof. The locking claw portions 461*g* and 461*h* are engaged with the pin side receiving portion 144*c* (see FIG.

9) provided in the boom connecting pin (for example, boom connecting pins 144_a_ and 144_b_) when the boom connecting pin is moved.

One of the second rack bars 461_a_ has a driving rack tooth portion 461_c_ (see FIG. 9) on a surface facing a switch gear 450. The driving rack tooth portion 461_c_ meshes with the tooth portion of the switch gear 450 when the switch gear 450 rotates by a predetermined amount in the second direction (the direction indicated by an arrow $A_2$ in FIG. 9).

When the switch gear 450 rotates by a predetermined amount in the second direction from the expanded state of the boom connecting mechanism 46, the driving rack tooth portion 461_c_ and the tooth portion of the switch gear 450 mesh with each other. When the switch gear 450 further rotates in the second direction, one of the second rack bars 461_a_ moves to the right on the basis of the mesh between the driving rack tooth portion 461_c_ and the tooth portion of the switch gear 450. When one of the second rack bars 461_a_ moves rightward, the synchronous gear 462 rotates, and the other second rack bar 461_b_ moves leftward.

The second biasing mechanism 463 returns the boom connecting mechanism 46 to the expanded state when the electric motor 41 is in the non-energized state and the brake mechanism 42 is in the OFF state in the contracted state of the boom connecting mechanism 46. The second biasing mechanism 463 biases the pair of second rack bars 461_a_ and 461_b_ in directions away from each other.

Figure 11A:
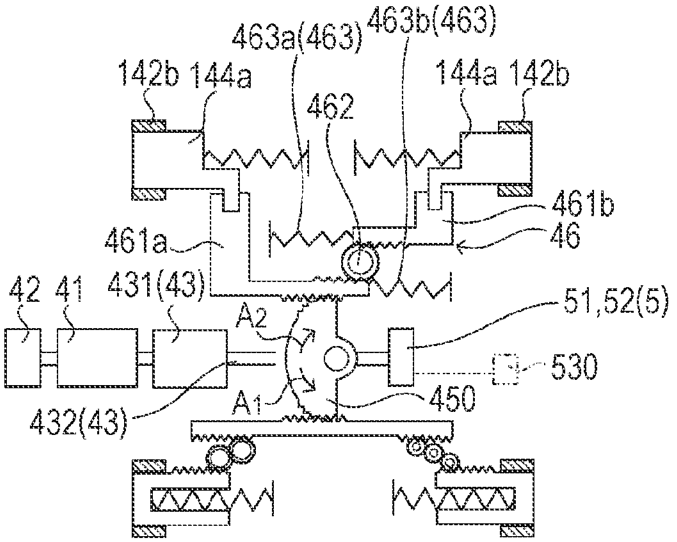
FIG. 11A is a schematic view for illustrating the operation of the boom connecting mechanism.
Figure 11B:
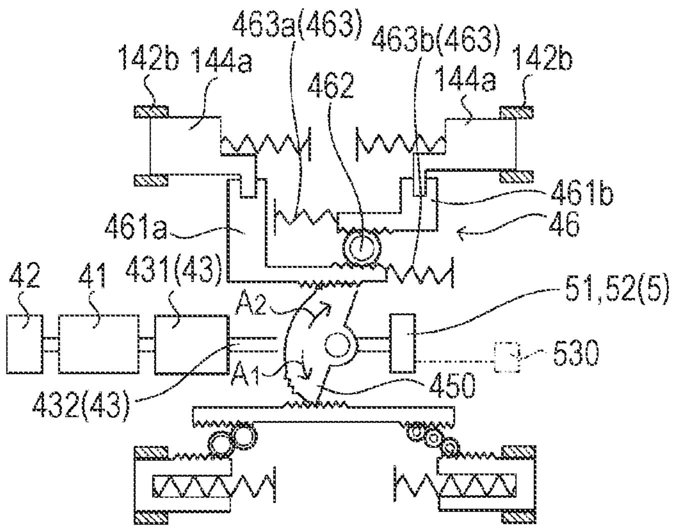
FIG. 11B is a schematic view for illustrating the operation of the boom connecting mechanism.
Figure 11C:
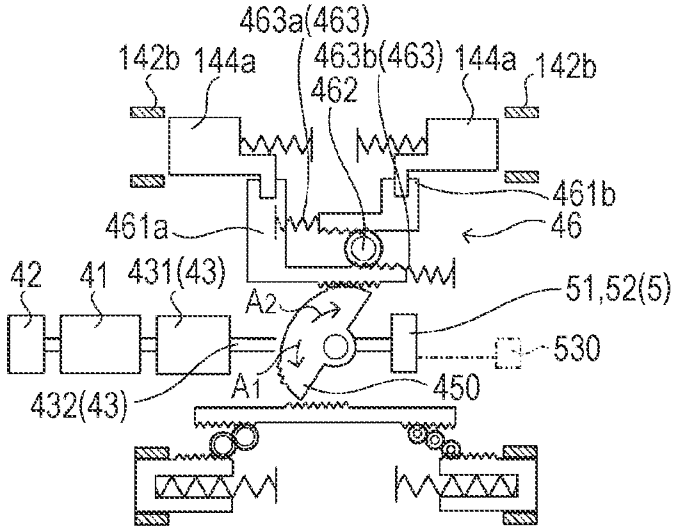
FIG. 11C is a schematic view for illustrating the operation of the boom connecting mechanism.

Specifically, the second biasing mechanism 463 includes a pair of coil springs 463_a_ and 463_b_ (see FIGS. 11A to 11C). The pair of coil springs 463_a_ and 463_b_ bias the proximal ends of the pair of second rack bars 461_a_ and 461_b_ toward the distal end side.

<Operation of Connecting Mechanism>

Hereinafter, an example of the operations of the above-described cylinder connecting mechanism 45 and the boom connecting mechanism 46 will be described.

<Operation of Cylinder Connecting Mechanism>

An example of the operation of the cylinder connecting mechanism 45 will be described with reference to FIGS. 2A to 2E and FIGS. 10A to 10C. The operation of the cylinder connecting mechanism 45 is an operation when the cylinder connecting mechanism 45 transitions from the expanded state to the contracted state on the basis of the power of the electric motor 41, and an operation when the cylinder connecting mechanism transitions from the contracted state to the expanded state on the basis of the biasing force of the first biasing mechanism 455.

FIG. 10A is a schematic view illustrating the expanded state of the cylinder connecting mechanism 45 and the engaged state between the pair of cylinder connecting pins 454A and 454B and the pair of cylinder pin receiving portions 141_a_ of the distal end boom 141. FIG. 10B is a schematic view illustrating a state in the middle of transition of the cylinder connecting mechanism 45 from the expanded state to the contracted state. Further, FIG. 10C is a schematic view illustrating a reduced state of the cylinder connecting mechanism 45 and a disengaged state between the pair of cylinder connecting pins 454A and 454B and the pair of cylinder pin receiving portions 141_a_ of the distal end boom 141.

The expanded state of the cylinder connecting mechanism 45 illustrated in FIG. 10A corresponds to the state of the cylinder connecting mechanism 45 in FIGS. 2A to 2D. The state of the cylinder connecting mechanism 45 illustrated in FIG. 10B corresponds to a state in the middle of transition from the state of the cylinder connecting mechanism 45 illustrated in FIG. 2D to the state of the cylinder connecting mechanism 45 illustrated in FIG. 2E. The contracted state of the cylinder connecting mechanism 45 illustrated in FIG. 10C corresponds to the state of the cylinder connecting mechanism 45 illustrated in FIG. 2E.

When the cylinder connecting mechanism 45 transitions from the expanded state to the contracted state, the control unit 530 (see FIGS. 10A to 11C) drives the electric motor 41. The power of the electric motor 41 is transmitted to the pair of cylinder connecting pins 454A and 454B through the following first transmission path and second transmission path. Further, the control unit 530 may have a configuration in which a CPU, a ROM, a RAM, an HDD, and the like are substantially connected by a bus, or a configuration including a one-chip LSI or the like.

The first transmission path is a path through which the power of the electric motor 41 is transmitted in the following order.

(first transmission path) Switch gear 450→first rack bar 451→first gear mechanism 452→right cylinder connecting pin 454A The second transmission path is a path through which the power of the electric motor 41 is transmitted in the following order.

(second transmission path) Switch gear 450→first rack bar 451→second gear mechanism 453→left cylinder connecting pin 454B Specifically, first, in the first transmission path and the second transmission path, the switch gear 450 rotates in the first direction (in a direction indicated by an arrow $A_1$ in FIG. 10A) on the basis of the power of the electric motor 41. At this time, the lower transmission shaft 432_b_ of the vertical transmission mechanism 432 rotates in the first direction together with the switch gear 450.

In the first transmission path, when the switch gear 450 rotates in the first direction, the first rack bar 451 moves rightward in accordance with the rotation. In the first transmission path, when the first rack bar 451 moves rightward, the right cylinder connecting pin 454A moves leftward via the first gear mechanism 452. On the other hand, when the first rack bar 451 moves rightward in the second transmission path, the left cylinder connecting pin 454B moves rightward via the second gear mechanism 453.

The position information detection device 5 described later detects that the pair of cylinder connecting pins 454A and 454B is disengaged from the pair of cylinder pin receiving portions 141_a_ of the distal end boom 141 and moved to a predetermined position (for example, the position illustrated in FIG. 10C). In other words, the position information detection device 5 detects a combination of the states of the pair of cylinder connecting pins 454A and 454B and the pair of boom connecting pins (for example, boom connecting pin 144_a_). Then, on the basis of the detection result, the control unit 530 (see FIGS. 10A to 11C) turns off the electric motor 41 while turning on the brake mechanism 42 to stop the operation of the cylinder connecting mechanism 45.

The transition of the cylinder connecting mechanism 45 from the contracted state to the expanded state is automatically performed on the basis of the biasing force of the first biasing mechanism 455 when the brake mechanism 42 is turned off in the non-energized state of the electric motor 41.

<Operation of Boom Connecting Mechanism>

Next, an example of the operation of the above-described boom connecting mechanism 46 will be described with reference to FIGS. 2A to 2E and FIGS. 11A to 11C.

FIG. 11A is a schematic view illustrating the expanded state of the boom connecting mechanism 46 and the engaged state between the pair of boom connecting pins 144_a_ and the pair of first boom pin receiving portions 142_b_ of the middle boom 142. FIG. 11B is a schematic view illustrating a state in the middle of the state transition of the boom connecting mechanism 46 from the expanded state to the contracted state. FIG. 11C is a schematic view illustrating a reduced state of the boom connecting mechanism 46 and a disengaged state between the pair of boom connecting pins 144_a_ and the pair of first boom pin receiving portions 142_b_ of the middle boom 142.

The expanded state of the boom connecting mechanism 46 illustrated in FIG. 11A corresponds to the state of the boom connecting mechanism 46 in FIG. 2A. The state of the boom connecting mechanism 46 illustrated in FIG. 11B corresponds to a state in the middle of transition from the state of the boom connecting mechanism 46 illustrated in FIG. 2A to the state of the boom connecting mechanism 46 illustrated in FIG. 2B. The reduced state of the boom connecting mechanism 46 illustrated in FIG. 11C corresponds to the state of the boom connecting mechanism 46 illustrated in FIG. 2B.

The boom connecting mechanism 46 transitions between the expanded state and the contracted state on the basis of the power of the electric motor 41. Here, the position of the switch gear 450 illustrated in FIG. 11A is defined as a reference position of the switch gear 450.

When the boom connecting mechanism 46 transitions from the expanded state to the contracted state, the control unit 530 (see FIGS. 10A to 11C) drives the electric motor 41 in a direction opposite to a direction in which the cylinder connecting mechanism 45 is operated. The power of the electric motor 41 is transmitted through the following path.

(Transmission path) Switch gear 450→one second rack bar 461_a_→synchronous gear 462→the other second rack bar 461_b_

First, in the transmission path, the switch gear 450 rotates in the second direction (the direction indicated by an arrow $A_2$ in FIG. 11A) in the rotation direction of the switch gear 450 on the basis of the power of the electric motor 41. At this time, the lower transmission shaft 432_b_ of the vertical transmission mechanism 432 rotates in the second direction together with the switch gear 450. When the switch gear 450 rotates in the second direction, one of the second rack bars 461_a_ moves rightward in accordance with the rotation.

Then, the synchronous gear 462 rotates according to the movement of the one second rack bar 461_a_ to the right. Then, the other second rack bar 461_b_ moves leftward in accordance with the rotation of the synchronous gear 462.

When the state transitions from the expanded state to the contracted state while the pair of second rack bars 461_a_ and 461_b_ is engaged with the pair of boom connecting pins 144_a_, the pair of boom connecting pins 144_a_ is disengaged from the pair of first boom pin receiving portions 142_b_ of the middle boom 142 (see FIG. 11C).

The position information detection device 5 described later detects that the pair of boom connecting pins 144_a_ is disengaged from the pair of first boom pin receiving portions 142_b_ of middle boom 142 and moved to a predetermined position (for example, the position illustrated in FIG. 11C). Then, on the basis of the detection result, the control unit 530 turns off the electric motor 41 while turning on the brake mechanism 42 to stop the operation of the boom connecting mechanism 46.

When the brake mechanism 42 is turned off in the non-energized state of the electric motor 41, the inserting operation of the boom connecting mechanism 46 is automatically performed on the basis of the energizing force of the second biasing mechanism 463. During this state transition, the pair of boom connecting pins 144_a_ moves away from each other.

The position information detection device 5 described later detects that a pair of boom connecting pins 144_a_ is engaged with a pair of first boom pin receiving portions 142_b_ of middle boom 142 and moved to a predetermined position (for example, the position illustrated in FIG. 11A). The detection result is used to control the next operation in the actuator 2.

The position information detection device 5 detects information on the positions of the pair of cylinder connecting pins 454A and 454B and the pair of boom connecting pins 144_a_ and 144_b_. In other words, the position information detection device 5 detects a combination of the states of the pair of cylinder connecting pins 454A and 454B and the pair of boom connecting pins (for example, boom connecting pin 144_a_).

First, a configuration of the position information detection device 5 will be described. The position information detection device 5 includes a support 50, a first detection device 51, a second detection device 52, and a cover member 54.

The first detection device 51 and the second detection device 52 are supported by the trunnion 40 by a support 50. The first detection device 51 and the second detection device 52 detect information on the positions of the pair of cylinder connecting pins 454A and 454B and the pair of boom connecting pins 144_a_ and 144_b_ by detection methods different from each other.

At the normal time, only one detection device of the first detection device 51 and the second detection device 52 detects the information on the positions of the pair of cylinder connecting pins 454A and 454B and the pair of boom connecting pins 144_a_ and 144_b_. Then, for example, when the control unit 530 (see FIGS. 10A to 11C) detects a failure (abnormality) of the one detection device, the other detection device of the first detection device 51 and the second detection device 52 detects information on the positions of the pair of cylinder connecting pins 454A and 454B and the pair of boom connecting pins 144_a_ and 144_b_.

Preferably, the one detection device is the second detection device 52, and the other detection device is the first detection device 51. However, the one detection device may be the first detection device 51, and the other detection device may be the second detection device 52. In the normal state, the first detection device 51 and the second detection device 52 may detect the information on the positions of the pair of cylinder connecting pins 454A and 454B and the pair of boom connecting pins 144_a_ and 144_b_.

In the case of this embodiment, in the normal state, the first detection device 51 and the second detection device 52 detect a combination of the states of the pair of cylinder connecting pins 454A and 454B and the pair of boom connecting pins 144_a_ and 144_b_. Then, the control unit 530 controls the telescopic movement of the telescopic boom 14 on the basis of the detection result of the second detection device 52.

Further, each of the first detection device 51 and the second detection device 52 cannot independently detect its own failure (abnormality). Therefore, when there is a contradiction (for example, a deviation of a predetermined value or more) between the detection value of the first detection device 51 and the detection value of the second detection device 52, the control unit 530 may determine that a failure (abnormality) has occurred in at least one detection device of the first detection device 51 and the second detection device 52.

In addition, the control unit 530 may perform the failure determination of the detection device on the basis of the detection values of the first detection device 51 and the second detection device 52 while detecting the information on the positions of the pair of cylinder connecting pins 454A and 454B and the pair of boom connecting pins 144*a* and 144*b* on the basis of the detection value of the second detection device 52 in the normal control. A failure determination method (abnormality detection control) will be described later.

At this time, the first detection device 51 may or may not detect information on the positions of the pair of cylinder connecting pins 454A and 454B and the pair of boom connecting pins 144*a* and 144*b*. When the occurrence of the failure (abnormality) in the second detection device 52 can be specified by the failure determination, the control unit 530 may detect the information on the positions of the pair of cylinder connecting pins 454A and 454B and the pair of boom connecting pins 144*a* and 144*b* on the basis of the detection value of the first detection device 51.

The support 50 is a member that supports the first detection device 51 and the second detection device 52 on the trunnion 40. The support 50 is fixed to the trunnion 40. Specifically, the support 50 is fixed to the rear side surface (side surface on the −X direction side) of the trunnion 40.

The support 50 includes a right side plate 501, a left side plate 502, a rear side plate 503, a right side fixing plate 504, and a left side fixing plate 505. The right side plate 501 has a plate shape parallel to the XZ plane. The left side plate 502 has a plate shape parallel to the XZ plane. The right side plate 501 and the left side plate 502 are disengaged from each other in the left to right direction (Y direction) and face each other. The right side plate 501 and the left side plate 502 each correspond to an example of the first plate portion.

The rear side plate 503 corresponds to an example of the second plate portion and has a plate shape parallel to the YZ plane. The rear side plate 503 connects a rear end (end on the −X direction side) of the right side plate 501 and a rear end (end on the −X direction side) of the left side plate 502 in the left to right direction. That is, the support 50 is a U-shaped plate-shaped member that is open in the up to down direction and open forward. A space surrounded by the right side plate 501, the left side plate 502, and the rear side plate 503 of the support 50 is an accommodation space 506. The accommodation space 506 may be regarded as a space defined by the support 50.

The right side fixing plate 504 has a plate shape parallel to the YZ plane. The right side fixing plate 504 is fixed to a distal end of the right side plate 501.

The left side fixing plate 505 has a plate shape parallel to the YZ plane. The left side fixing plate 505 is fixed to a distal end of the left side plate 502.

The distal end of the support 50 (distal ends of the right side plate and the left side plate) is fixed to the rear side surface of the trunnion 40 via the right side fixing plate 504 and the left side fixing plate 505. In this state, each of the right side fixing plate 504 and the left side fixing plate 505 is positioned with respect to the trunnion 40 by the positioning pin 507 inserted into the fixed portion 400 on the trunnion side. Such a configuration contributes to improvement in assembling work efficiency when the support 50 is assembled to the trunnion 40.

The lower transmission shaft 432*b* is disposed between the right side plate 501 and the left side plate 502 of the support 50. That is, the lower transmission shaft 432*b* is disposed in the accommodation space 506. The right side plate 501 and the left side plate 502 are parallel to the lower transmission shaft 432*b*.

The first detection device 51 includes a first detection object 510, a second detection object 511, a first sensor 512, a second sensor 513, and a third sensor 514. The first detection device 51 corresponds to an example of a sub-detection device. The first detection device 51 detects information on the positions of the pair of cylinder connecting pins 454A and 454B and the pair of boom connecting pins 144*a* and 144*b* on the basis of a combination of outputs (detection values) of the first sensor 512, the second sensor 513, and the third sensor 514.

The first detection object 510 is fixed to the lower transmission shaft 432*b* in a state where the lower transmission shaft 432*b* is inserted into the center hole. That is, the first detection object 510 is arranged in the accommodation space 506. The first detection object 510 rotates together with the lower transmission shaft 432*b*. The first detection object 510 has a first cylindrical surface 510*a* and a first flat surface 510*b* on the outer peripheral surface.

The first cylindrical surface 510*a* corresponds to an example of a first detection surface of the first detection object. The first cylindrical surface 510*a* is a cylindrical surface having a predetermined outer diameter and provided on a part (also referred to as a first portion) of the outer peripheral surface of the first detection object 510. The first flat surface 510*b* corresponds to an example of a second detection surface of the first detection object. The first flat surface 510*b* is a flat surface provided on the remaining portion (also referred to as a second portion) of the outer peripheral surface of the first detection object 510. The shapes of the first detection surface of the first detection object and the second detection surface of the first detection object are not limited to the shapes of this embodiment. The shapes of the first detection surface of the first detection object and the second detection surface of the first detection object may be shapes that can be distinguished from each other (that is, different shapes).

Figure 13:
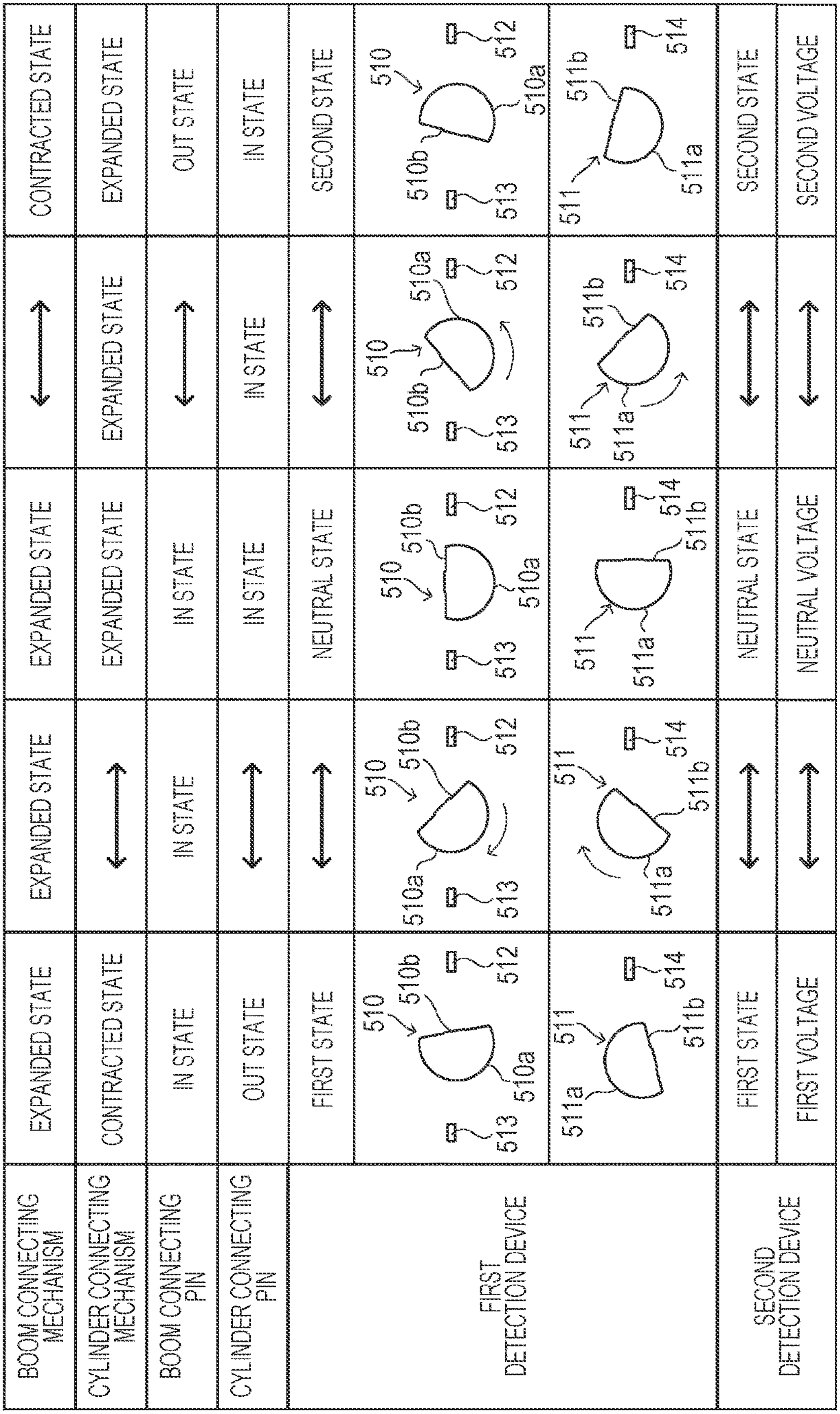
FIG. 13 is a table for illustrating a detection operation of a position information detection device.

As illustrated in FIG. 13, in the neutral state, the first cylindrical surface 510*a* of the first detection object 510 is disposed in the lower half portion, and the first flat surface 510*b* is disposed in the upper half portion. The neutral state of the first detection object 510 corresponds to the in-state of the pair of cylinder connecting pins 454A and 454B and the boom connecting pin 144*a* (see FIGS. 2A to 2E).

The second detection object 511 is fixed to the lower transmission shaft 432*b* in a state where the lower transmission shaft 432*b* is inserted into the center hole. That is, the second detection object 511 is arranged in the accommodation space 506. The second detection object 511 rotates together with the lower transmission shaft 432*b*. The second detection object 511 is disposed on the front side of the first detection object 510. The second detection object 511 has a second cylindrical surface 511*a* and a second flat surface 511*b* on the outer peripheral surface.

The second cylindrical surface 511*a* corresponds to an example of a first detection surface of the second detection object. The second cylindrical surface 511*a* is a cylindrical surface having a predetermined outer diameter provided on a part (also referred to as a first portion) of the outer peripheral surface of the second detection object 511. The second flat surface 511*b* corresponds to an example of a second detection surface of the second detection object. The second flat surface 511*b* is a flat surface provided on the remaining portion (also referred to as a second portion) of the outer peripheral surface of the second detection object

511. The shapes of the first surface to be detected of the second detection object and the second surface to be detected of the second detection object are not limited to the shapes of this embodiment. The shapes of the first surface to be detected of the second detection object and the second surface to be detected of the second detection object may be shapes that can be distinguished from each other (that is, different shapes).

As illustrated in FIG. 13, in the neutral state, the second cylindrical surface 511_a_ of the second detection object 511 is disposed in the left half, and the second flat surface 511_b_ is disposed in the right half. The neutral state of the second detection object 511 corresponds to the in-state of the pair of cylinder connecting pins 454A and 454B and the boom connecting pin 144_a_ (see FIGS. 2A to 2E). As illustrated in FIGS. 10A and 11A, the neutral state of the second detection object 511 corresponds to the expanded state of the cylinder connecting mechanism 45 and the expanded state of the boom connecting mechanism 46.

Each of the first sensor 512, the second sensor 513, and the third sensor 514 corresponds to an example of a first detector and is a non-contact proximity sensor. Each of the first sensor 512, the second sensor 513, and the third sensor 514 is supported by the support 50.

Specifically, the first sensor 512 is supported by the right side plate 501 of the support 50. The distal end of the first sensor 512 faces the outer peripheral surface of the first detection object 510 in the left to right direction. The first sensor 512 outputs an electric signal corresponding to the distance to the outer peripheral surface of the first detection object 510.

For example, the output of the first sensor 512 is turned on in a state of facing the first cylindrical surface 510_a_ of the first detection object 510. On the other hand, the output of the first sensor 512 is turned off in a state of facing the first flat surface 510_b_ of the first detection object 510.

The second sensor 513 is supported by the left side plate 502 of the support 50. The distal end of the second sensor 513 faces the outer peripheral surface of the first detection object 510 in the left to right direction. The first sensor 512 and the second sensor 513 face each other in the left to right direction. The second sensor 513 outputs an electric signal corresponding to the distance to the outer peripheral surface of the first detection object 510.

For example, the output of the second sensor 513 is turned on in a state of facing the first cylindrical surface 510_a_ of the first detection object 510. On the other hand, the output of the first sensor 512 is turned off in a state of facing the first flat surface 510_b_ of the first detection object 510.

The third sensor 514 is supported by the right side plate 501 of the support 50. The third sensor 514 is disposed on the front side of the first sensor 512 on the right side plate 501 of the support 50. The distal end of the third sensor 514 faces the outer peripheral surface of the second detection object 511 in the left to right direction. The third sensor 514 outputs an electric signal according to the distance to the outer peripheral surface of the second detection object 511. The third sensor 514 may be supported by the left side plate 502 of the support 50. The position of the third sensor 514 is not limited to the illustrated case.

For example, the output of the third sensor 514 is turned on in a state of facing the second cylindrical surface 511_a_ of the second detection object 511. On the other hand, the output of the third sensor 514 is turned OFF while facing the second flat surface 511_b_ of the second detection object 511.

The second detection device 52 is a non-contact potentiometer, and includes a detection object 520 and a sensor 521. The second detection device 52 corresponds to an example of a main-detection device. The detection object 520 is a magnet, and is fixed to the lower transmission shaft 432_b_ in a state where the rear end of the lower transmission shaft 432_b_ is inserted into the center hole. Therefore, the detection object 520 rotates together with the lower transmission shaft 432_b_. In addition, the detection object 520 is disposed behind the first detection object 510 of the first detection device 51.

The sensor 521 corresponds to an example of a second detector, has a Hall element, and is supported by the rear side plate 503 of the support 50.

As described above, in the case of this embodiment, the first sensor 512, the second sensor 513, and the third sensor 514 of the first detection device 51, and the sensor 521 of the second detection device 52 are supported by the support 50. In other words, the support 50 unitizes the first sensor 512, the second sensor 513, and the third sensor 514 of the first detection device 51, and the sensor 521 of the second detection device 52. Therefore, by removing the support 50 from the trunnion 40, the sensors 512, 513, 514, and 521 can be collectively removed from the trunnion 40. Such a configuration contributes to improvement of assembly work efficiency and improvement of maintenance work efficiency.

The detection surfaces of the sensors 512, 513, 514, and 521 are disposed in the accommodation space 506 surrounded by the support 50. Such a configuration can suppress damage to the detection surfaces of the sensors 512, 513, 514, and 521.

The sensor 521 faces the detection object 520 in the front to rear direction. The sensor 521 outputs a voltage (see FIG. 15) corresponding to the phase of the detection object 520. That is, the sensor 521 outputs a voltage corresponding to the rotation angle of the lower transmission shaft 432_b_ to which the detection object 520 is fixed.

In the case of this embodiment, a method (detection method) in which the first detection device 51 detects the information regarding the position is different from a method (detection method) in which the second detection device 52 detects the information regarding the position. That is, the pin moving mechanism 4 according to this embodiment includes two detection mechanisms having different detection methods for detecting information on the positions of the pair of cylinder connecting pins 454A and 454B and the pair of boom connecting pins 144_a_ and 144_b_. The second detection device may be a contact potentiometer or an encoder.

Figure 6:
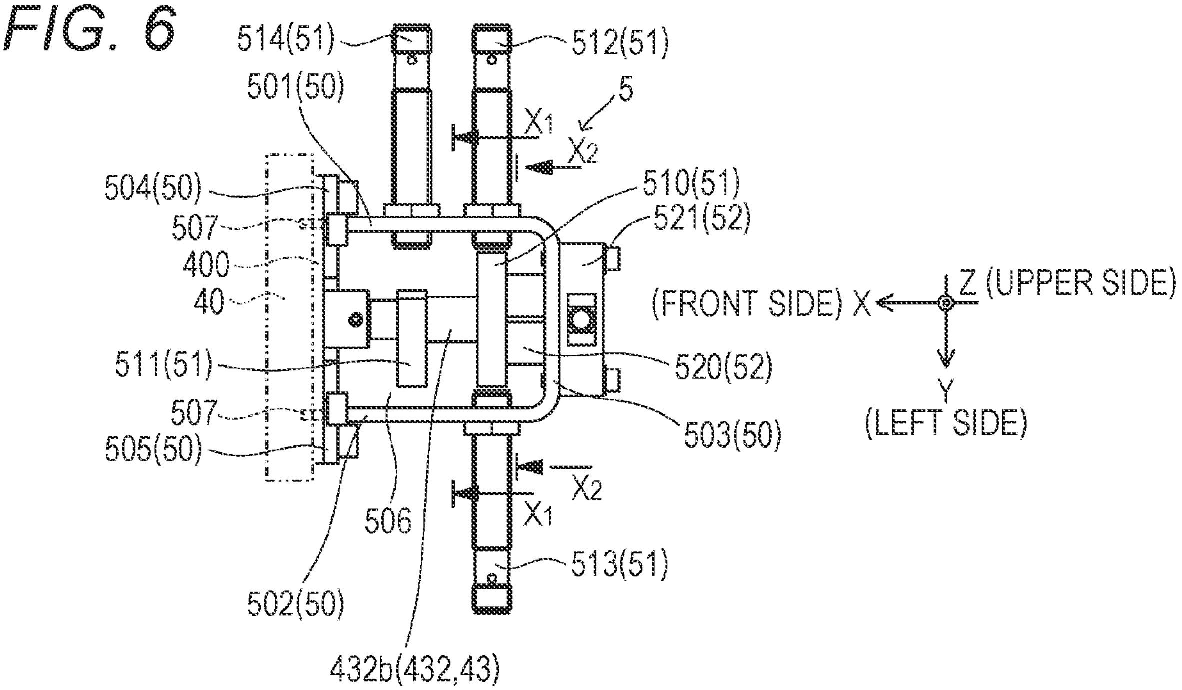
FIG. 6 is a view of a detection device as viewed from an arrow Aa in FIG. 3.
Figure 7:
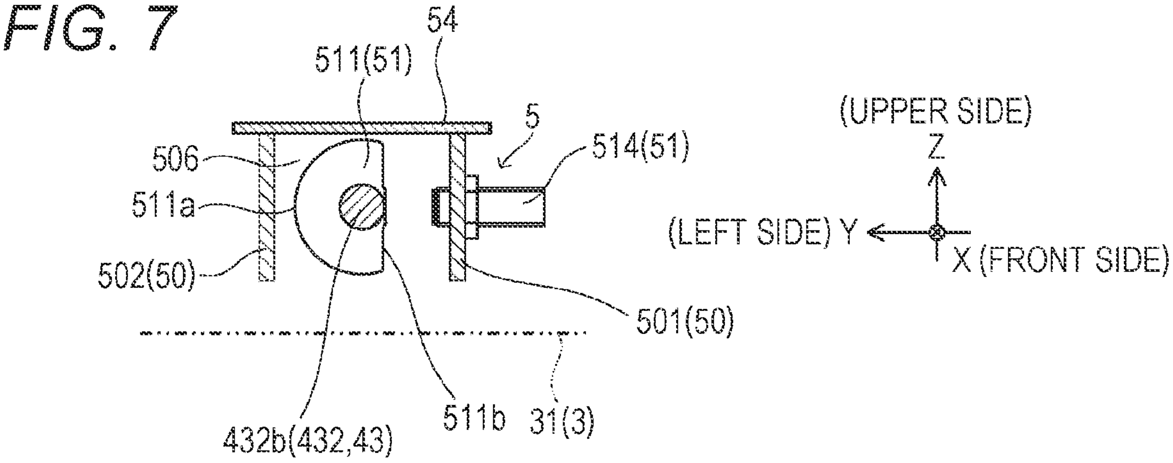
FIG. 7 is a cross-sectional view taken along a line X1-X1 of FIG. 6 for illustrating a first detection device.
Figure 8:
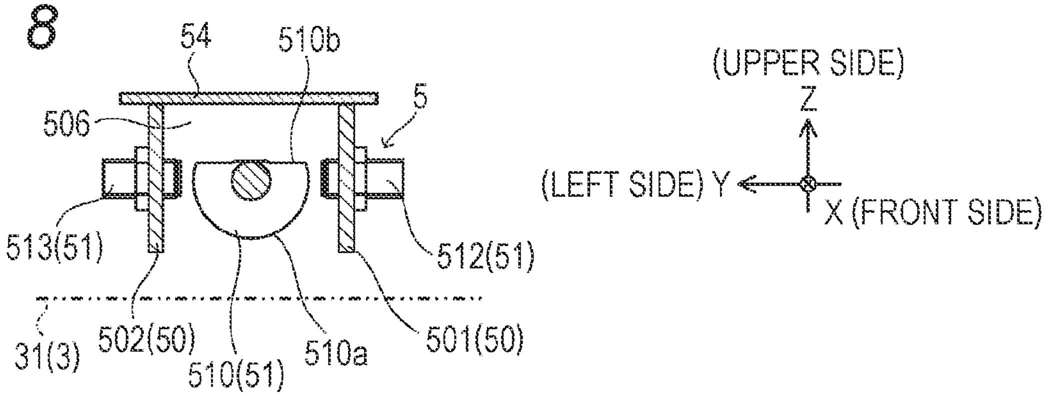
FIG. 8 is a cross-sectional view taken along a line X2-X2 of FIG. 6 for illustrating the first detection device.
Figure 9:
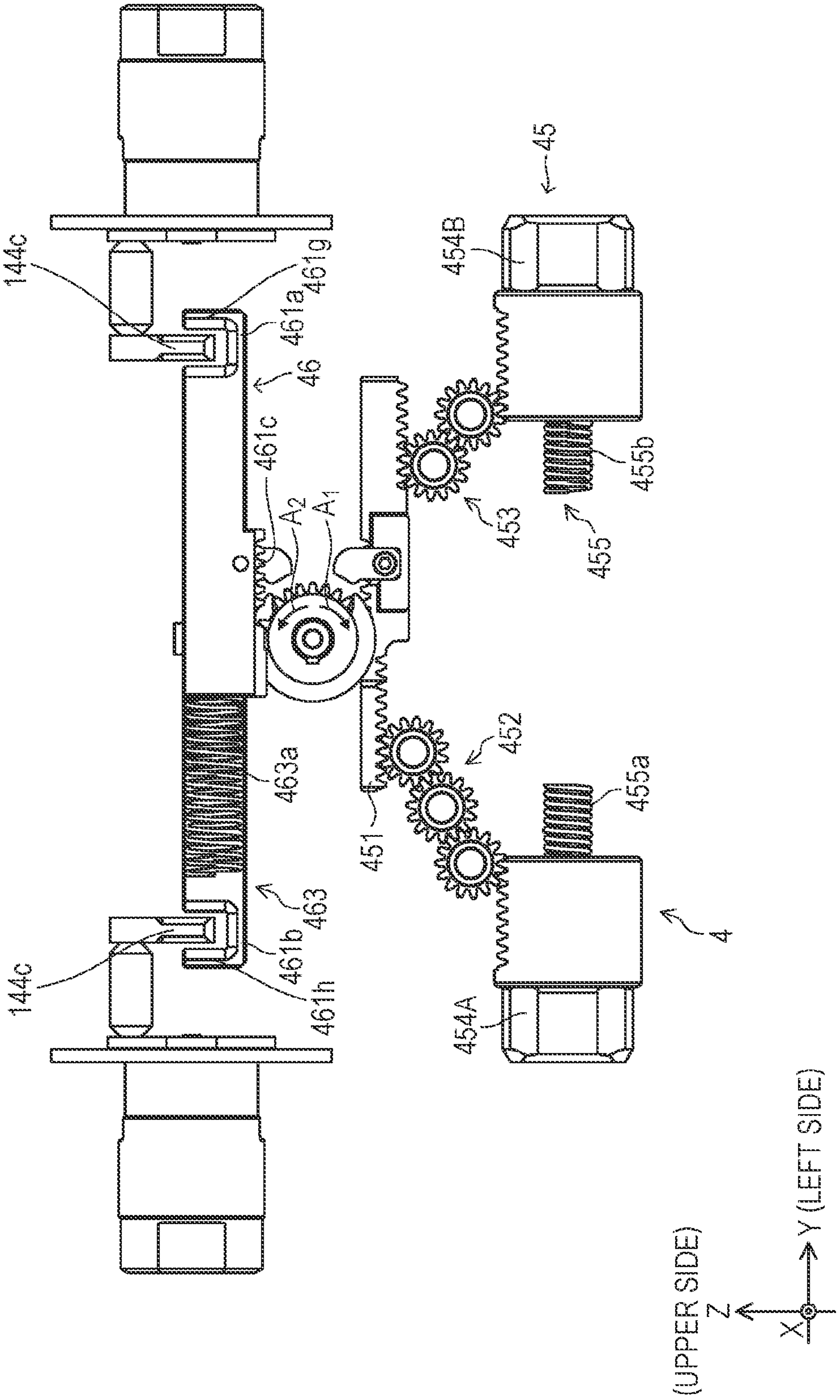
FIG. 9 is a view illustrating the pin moving module in which a boom connecting mechanism is in the expanded state and a cylinder connecting mechanism is in the expanded state.

The cover member 54 is, for example, a plate member having a rectangular shape and parallel to the XY plane. As illustrated in FIGS. 7 and 8, the cover member 54 covers the upper opening of the support 50 from above. In FIG. 6, the cover member 54 is omitted.

The cover member 54 is fixed to the upper end of the support 50 or the trunnion 40. Such a cover member 54 prevents foreign matter from entering the accommodation space 506 from the upper opening of the support 50. Furthermore, as illustrated in FIGS. 7 and 8, the opening portion on the lower side of the support 50 faces the surface of the telescopic cylinder 3 (specifically, the rod member 31) with a predetermined distance therebetween. Such a configuration prevents foreign matter from entering the accommodation space 506 from the lower opening of the support 50.

For example, if foreign matter adheres to the detection surfaces of the first sensor 512, the second sensor 513, and the third sensor 514 of the first detection device 51, erroneous detection may occur in each of the sensors 512, 513, and 514, and the reliability of the detection result may be reduced. In the case of this embodiment, since the foreign matter is suppressed from entering the accommodation space 506 from the upper and lower openings of the support 50, the reliability of the detection results of the first detection device 51 and the second detection device 52 can be secured.

In addition, since the lower opening of the accommodation space 506 faces the surface of the telescopic cylinder 3, even if the first detection object 510 and the second detection object 511 of the first detection device 51 or the detection object 520 of the second detection device 52 fall off from the lower transmission shaft 432*b*, it is possible to suppress falling of the detection objects 510, 511, and 520 downward.

In the position information detection device 5 as described above, in the normal state, the first detection device 51 and the second detection device 52 detect information on the positions of the pair of cylinder connecting pins 454A and 454B and the boom connecting pin 144*a*. Then, the telescopic movement of the telescopic boom 14 is controlled on the basis of the detection result of the second detection device 52. In addition, when a failure (abnormality) of the second detection device 52 is detected, the control unit 530 controls the telescopic movement of the telescopic boom 14 on the basis of the detection result of the first detection device 51. In the normal state, only the second detection device 52 may detect the information on the positions of the pair of cylinder connecting pins 454A and 454B and the boom connecting pin 144*a*. In this case, when the control unit 530 detects a failure (abnormality) of the second detection device 52, the control unit 530 may start detection of information on the positions of the pair of cylinder connecting pins 454A and 454B and the boom connecting pin 144*a* by the first detection device 51.

Figure 12:
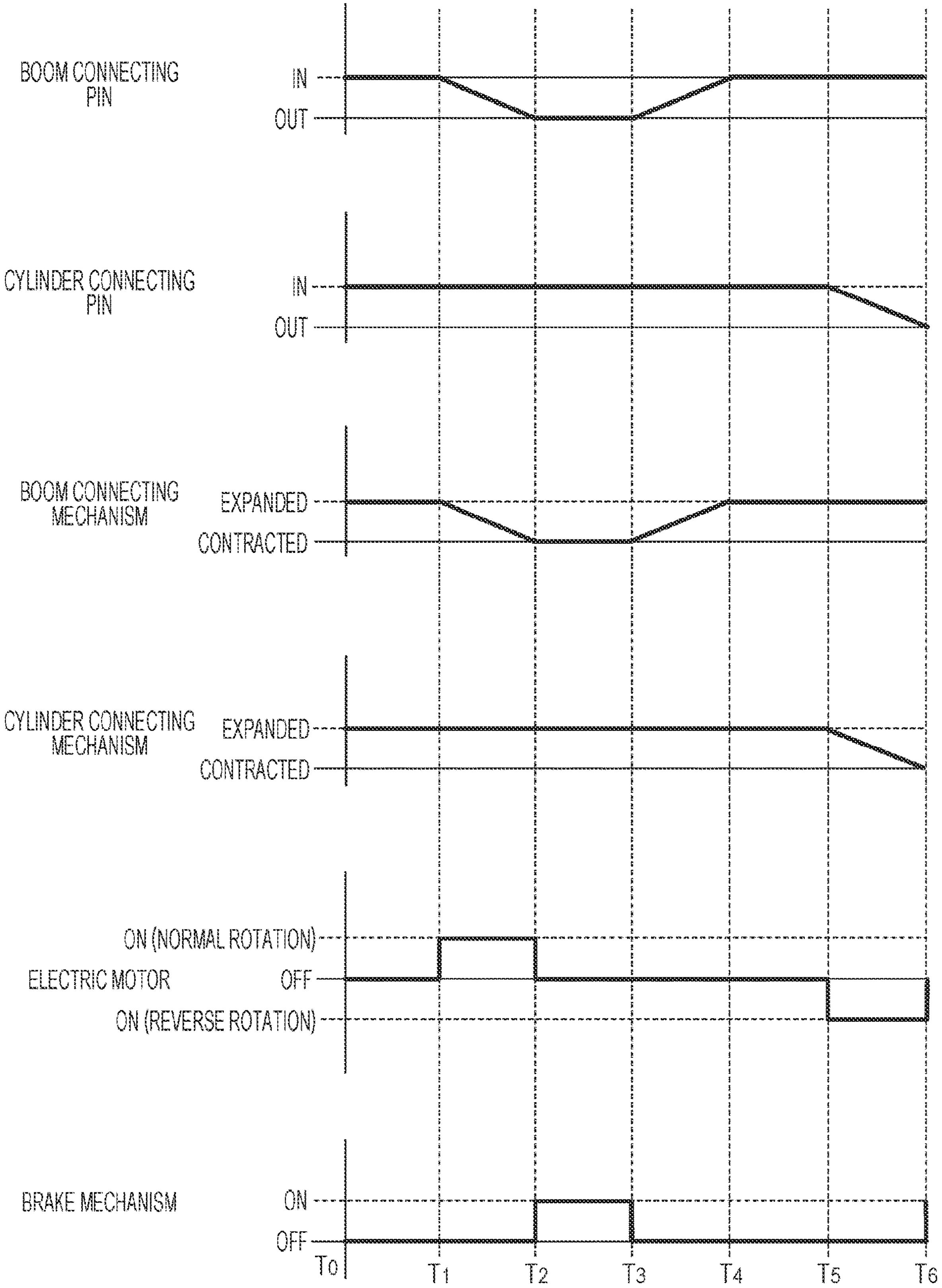
FIG. 12 is a timing chart for illustrating the operation of the pin moving module.

Here, the operation of the position information detection device 5 will be described with reference to FIGS. 12 and 13. FIG. 12 is a timing chart at the time of the expanding operation of the distal end boom 141 in the telescopic boom 14. FIG. 13 is a diagram illustrating a relationship between the states of the pair of cylinder connecting pins 454A and 454B and the boom connecting pin 144*a* and the states of the first detection device 51 and the second detection device 52.

Hereinafter, only the expanding operation of the distal end boom 141 in the telescopic boom 14 will be described. The contraction operation of the distal end boom 141 is reverse to the following procedure of the telescopic movement.

In the following description, the state transition between the expanded state and the contracted state of the cylinder connecting mechanism 45 and the boom connecting mechanism 46 is as described above. Therefore, a detailed description of the state transition of the cylinder connecting mechanism 45 and the boom connecting mechanism 46 will be omitted.

In addition, the control unit (not illustrated) controls switching of ON/OFF of the electric motor 41 and switching of ON/OFF of the brake mechanism 42 on the basis of the output of the position information detection device 5.

FIG. 2A illustrates the contracted state of the telescopic boom 14. In this state, the distal end boom 141 is connected to the middle boom 142 via a boom connecting pin 144*a*. Therefore, the distal end boom 141 cannot be displaced in the longitudinal direction (left to right direction in FIGS. 2A to 2E) with respect to the middle boom 142.

In FIG. 2A, the distal ends of the pair of cylinder connecting pins 454A and 454B are engaged with the pair of cylinder pin receiving portions 141*a* of the distal end boom 141. That is, the distal end boom 141 and the cylinder member 32 are in a connected state.

In the state of FIG. 2A, the state of each member is as follows (see $T_0$ to $T_1$ in FIG. 12).

Brake mechanism 42: OFF
Electric motor 41: OFF
Cylinder connecting mechanism 45: EXPANDED STATE
Boom connecting mechanism 46: EXPANDED STATE
Cylinder connecting pins 454A and 454B: IN-STATE
Boom connecting pin 144*a*: IN-STATE In the state illustrated in FIG. 2A, the first detection device 51 and the second detection device 52 of the position information detection device 5 are in the neutral state as illustrated in FIG. 13. In the neutral state of the first detection device 51 and the second detection device 52, the cylinder connecting pins 454A and 454B are in the in-state, and the boom connecting pin 144*a* is in the in-state. This combination of states is a first set of combinations of states of the cylinder connecting pin and the boom connecting pin.

In the neutral state of the first detection device 51, the first sensor 512 and the second sensor 513 face the first cylindrical surface 510*a* of the first detection object 510. Therefore, the outputs of the first sensor 512 and the second sensor 513 are in the ON state. On the other hand, in the neutral state of the first detection device 51, the third sensor 514 faces the second flat surface 511*b* of the second detection object 511. Therefore, the output of the third sensor 514 is in the OFF state.

When the outputs of the first sensor 512 and the second sensor 513 are in the ON state and the output of the third sensor 514 is in the OFF state, the first detection device 51 detects that the pair of cylinder connecting pins 454A and 454B is in the in-state and the boom connecting pin 144*a* is in the in-state. In the neutral state of the first detection device 51, the switch gear 450 is located at the reference position illustrated in FIGS. 10A and 11A.

In the neutral state of the second detection device 52, the rotation angle of the detection object 520 is 0°. In the neutral state of the second detection device 52, the sensor 521 is configured to output a predetermined voltage (hereinafter, the voltage is referred to as a neutral voltage) corresponding to the neutral state. In the neutral state of the second detection device 52, the switch gear 450 is located at the reference position illustrated in FIGS. 10A and 11A.

When the output of the sensor 521 is the neutral voltage, the second detection device 52 detects that the pair of cylinder connecting pins 454A and 454B is in the in-state and the boom connecting pin 144*a* is in the in-state.

Next, in the state illustrated in FIG. 2A, the electric motor 41 is rotated forward (rotated in the direction indicated by an arrow $A_2$ in FIG. 11A), and the pair of boom connecting pins 144*a* is displaced in the direction of disengaged from the pair of first boom pin receiving portions 142*b* of the middle boom 142 by the boom connecting mechanism 46 of the actuator 2. At this time, the boom connecting mechanism 46 transitions from the expanded state to the contracted state.

Figure 2B:
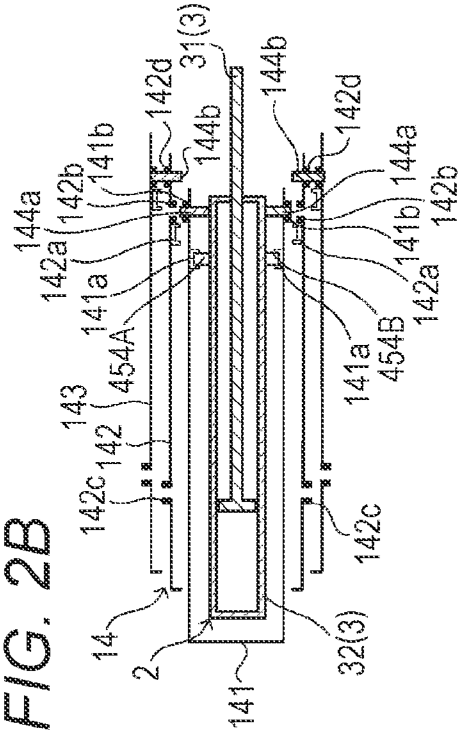
FIG. 2B is a schematic view for illustrating a structure and a telescopic movement of the telescopic boom.

The state of each member at the time of state transition to FIGS. 2A to 2B is as follows (see $T_1$ to $T_2$ in FIG. 12).

Brake mechanism 42: OFF
Electric motor 41: ON (NORMAL ROTATION)
Cylinder connecting mechanism 45: EXPANDED STATE
Boom connecting mechanism 46: EXPANDED STATE→CONTRACTED STATE
Cylinder connecting pins 454A and 454B: IN-STATE
Boom connecting pin 144*a*: IN-STATE→OUT-STATE When the boom connecting pin 144*a* transitions from the in-state to the out-state, as illustrated in FIG. 13, the first detection device 51 and the second detection device 52 of the position information detection device 5 transition from the neutral state to the second state in accordance with the rotation of the lower transmission shaft 432*b*.

When the first detection device 51 transitions from the neutral state to the second state, the first sensor 512 faces the first cylindrical surface 510*a* of the first detection object 510. Therefore, the output of the first sensor 512 is in the ON state. On the other hand, the second sensor 513 faces the first flat surface 510*b* of the first detection object 510. Therefore, the output of the second sensor 513 is in the OFF state.

When the state of the first detection device 51 transitions from the neutral state to the second state, the third sensor 514 faces the second flat surface 511*b* of the second detection object 511. Therefore, the output of the third sensor 514 is in the OFF state.

As described above, when the output of the first sensor 512 is in the ON state, the output of the second sensor 513 is in the OFF state, and the output of the third sensor 514 is in the OFF state, the first detection device 51 detects that the boom connecting pin 144*a* transitions from the in-state to the out-state.

When the boom connecting pin 144*a* is in the out-state, the first detection device 51 is in the second state. Conversely, when the first detection device 51 is in the second state, the boom connecting pin 144*a* is in the out-state (the state illustrated in FIG. 2B).

In the second state of the first detection device 51, the first sensor 512 faces the first cylindrical surface 510*a* of the first detection object 510. Therefore, the output of the first sensor 512 is in the ON state. On the other hand, in the second state of the first detection device 51, the second sensor 513 faces the first flat surface 510*b* of the first detection object 510. Therefore, the output of the second sensor 513 is in the OFF state.

In the second state of the first detection device 51, the third sensor 514 faces the second cylindrical surface 511*a* of the second detection object 511. Therefore, the output of the third sensor 514 is in the ON state.

As described above, when the output of the first sensor 512 is in the ON state, the output of the second sensor 513 is in the OFF state, and the output of the third sensor 514 is in the ON state, the first detection device 51 detects that the boom connecting pin 144*a* is in the out-state.

When the state of the second detection device 52 transitions from the neutral state to the second state, the output of the sensor 521 changes according to the phase of the detection object 520. Here, the sensor 521 is configured to output a predetermined voltage (hereinafter, referred to as a second voltage) corresponding to the second state. Therefore, when the second detection device 52 transitions from the neutral state to the second state, the output of the sensor 521 changes from the neutral voltage to the second voltage. When the output of the sensor 521 changes from the neutral voltage to the second voltage, the second detection device 52 detects that the boom connecting pin 144*a* transitions from the in-state to the out-state.

When the boom connecting pin 144*a* is in the out-state, the second detection device 52 is in the second state. Conversely, when the second detection device 52 is in the second state, the boom connecting pin 144*a* is in the out-state. In the second state of the second detection device 52, the output of the sensor 521 is the second voltage. When the output of the sensor 521 reaches the second voltage, the second detection device 52 detects that the boom connecting pin 144*a* is in the out-state.

When the boom connecting pin 144*a* is the out-state, the engagement between the pair of boom connecting pins 144*a* and the pair of first boom pin receiving portions 142*b* of the middle boom 142 is released (see FIG. 2B). When the first detection device 51 and/or the second detection device 52 detect that the boom connecting pin 144*a* is the out-state, the control unit turns off the electric motor 41 while turning on the brake mechanism 42 to stop the operation of the boom connecting mechanism 46.

The timing to turn off the electric motor 41 and the timing to turn on the brake mechanism 42 are appropriately controlled by the control unit. For example, although not illustrated, the electric motor 41 is turned off after the brake mechanism 42 is turned on.

In the state of FIG. 2B, the state of each member is as follows (see $T_2$ of FIG. 12).

Brake mechanism 42: ON
Electric motor 41: OFF
Cylinder connecting mechanism 45: EXPANDED STATE
Boom connecting mechanism 46: REDUCED STATE
Cylinder connecting pins 454A and 454B: IN-STATE
Boom connecting pin 144*a*: OUT-STATE In the second state (see FIG. 13) of the first detection device 51 and the second detection device 52, the cylinder connecting pins 454A and 454B are in the in-state, and the boom connecting pin 144*a* is in the out-state. The combination of the states is a second set of combinations of states of the cylinder connecting pin and the boom connecting pin.

Next, in the state illustrated in FIG. 2B, pressurized oil is supplied to the hydraulic chamber on the expansion side in the telescopic cylinder 3 of the actuator 2. Then, the cylinder member 32 is displaced in the expanding direction (left side in FIGS. 2A to 2E).

With the above-described displacement of the cylinder member 32, the distal end boom 141 is displaced in the expanding direction (see FIG. 2C). At this time, the state of each unit is maintained until the state of $T_2$ in FIG. 12 is $T_3$.

Next, in the state illustrated in FIG. 2C, the brake mechanism 42 is released. Then, on the basis of the biasing force of the second biasing mechanism 463, the boom connecting mechanism 46 displaces the pair of boom connecting pins 144*a* in the direction of engaging with the pair of second boom pin receiving portions 142*c* of the middle boom 142. At this time, the boom connecting mechanism 46 transitions (that is, automatically returns) from the contracted state to the expanded state.

The state of each member at the time of state transition to FIGS. 2C to 2D is as follows (see $T_3$ to $T_4$ in FIG. 12).

Brake mechanism 42: OFF
Electric motor 41: OFF
Cylinder connecting mechanism 45: EXPANDED STATE
Boom connecting mechanism 46: REDUCED STATE→EXPANDED STATE
Cylinder connecting pins 454A and 454B: IN-STATE
Boom connecting pin 144*a*: OUT-STATE→IN-STATE When the boom connecting pin 144*a* transitions from the out-state to the in-state, the first detection device 51 and the second detection device 52 of the position information detection device 5 transition from the second state to the neutral state in accordance with the rotation of the lower transmission shaft 432*b* as illustrated in FIG. 13.

When the state of the first detection device 51 transitions from the second state to the neutral state, the first sensor 512 faces the first cylindrical surface 510*a* of the first detection object 510. Therefore, the output of the first sensor 512 is in the ON state. On the other hand, the second sensor 513 faces the first flat surface 510*b* of the first detection object 510. Therefore, the output of the second sensor 513 is in the OFF state.

When the state of the first detection device 51 transitions from the second state to the neutral state, the third sensor 514 faces the second flat surface 511*b* of the second detection object 511. Therefore, the output of the third sensor 514 is in the OFF state.

When the boom connecting pin 144*a* is in the in-state, the first detection device 51 is in the neutral state. Conversely, when the first detection device 51 is in the neutral state, the boom connecting pin 144*a* is in the in-state (the state illustrated in FIG. 2D). The states of the first sensor 512, the second sensor 513, and the third sensor 514 in the neutral state of the first detection device 51 are as described above.

As described above, when the output of the first sensor 512 is in the ON state, the output of the second sensor 513 is in the ON state, and the output of the third sensor 514 is in the OFF state, the first detection device 51 detects that the boom connecting pin 144*a* is in the neutral state.

In addition, when the second detection device 52 transitions from the second state to the neutral state, the output of the sensor 521 changes from the second voltage to the neutral voltage according to the phase of the detection object 520. When the output of the sensor 521 changes from the second voltage to the neutral voltage, the second detection device 52 detects that the boom connecting pin 144*a* transitions from the out-state to the in-state.

When the boom connecting pin 144*a* is in the in-state, the second detection device 52 is in the neutral state. In the neutral state of the second detection device 52, the output of the sensor 521 is a neutral voltage. The second detection device 52 detects that the boom connecting pin 144*a* is in the in-state when the output of the sensor 521 reaches the neutral voltage.

In this state, as illustrated in FIG. 2D, the pair of boom connecting pins 144*a* is engaged with the pair of second boom pin receiving portions 142*c* of the middle boom 142.

The state of each member in the state illustrated in FIG. 2D is as follows (see $T_4$ in FIG. 12).

Brake mechanism 42: OFF
Electric motor 41: OFF
Cylinder connecting mechanism 45: EXPANDED STATE
Boom connecting mechanism 46: EXPANDED STATE
Cylinder connecting pins 454A and 454B: IN-STATE
Boom connecting pin 144*a*: IN-STATE Furthermore, in the state illustrated in FIG. 2D, the electric motor 41 is reversed (rotated in the direction indicated by an arrow $A_1$ in FIG. 10A), and the cylinder connecting mechanism 45 displaces the pair of cylinder connecting pins 454A and 454B in the direction of disengaged from the pair of cylinder pin receiving portions 141*a* of the distal end boom 141. At this time, the cylinder connecting mechanism 45 transitions from the expanded state to the contracted state.

The state of each member at the time of state transition to FIGS. 2D to 2E is as follows (see $T_5$ to $T_6$ in FIG. 12).

Brake mechanism 42: OFF
Electric motor 41: ON (REVERSE ROTATION)
Cylinder connecting mechanism 45: EXPANDED STATE→CONTRACTED STATE
Boom connecting mechanism 46: EXPANDED STATE
Cylinder connecting pins 454A and 454B: IN-STATE→OUT-STATE
Boom connecting pin 144*a*: IN-STATE When the pair of cylinder connecting pins 454A and 454B transitions from the in-state to the out-state, as illustrated in FIG. 13, the first detection device 51 and the second detection device 52 of the position information detection device 5 transition from the neutral state to the first state according to the rotation of the lower transmission shaft 432*b*.

When the first detection device 51 transitions from the neutral state to the first state, the first sensor 512 faces the first flat surface 510*b* of the first detection object 510. Therefore, the output of the first sensor 512 is in the OFF state. On the other hand, the second sensor 513 faces the first cylindrical surface 510*a* of the first detection object 510. Therefore, the output of the second sensor 513 is in the ON state.

When the state of the first detection device 51 transitions from the neutral state to the first state, the third sensor 514 faces the second flat surface 511*b* of the second detection object 511. Therefore, the output of the third sensor 514 is in the OFF state.

As described above, when the output of the first sensor 512 is in the OFF state, the output of the second sensor 513 is in the ON state, and the output of the third sensor 514 is in the OFF state, the first detection device 51 detects that the pair of cylinder connecting pins 454A and 454B is transitioned from the in-state to the out-state.

Then, when the pair of cylinder connecting pins 454A and 454B is in the out-state, the first detection device 51 is in the first state. Conversely, when the first detection device 51 is in the first state, the pair of cylinder connecting pins 454A and 454B is in the out-state (state illustrated in FIG. 2E).

In the first state of the first detection device 51, the first sensor 512 faces the first flat surface 510*b* of the first detection object 510. Therefore, the output of the first sensor 512 is in the OFF state. On the other hand, in the first state of the first detection device 51, the second sensor 513 faces the first cylindrical surface 510*a* of the first detection object 510. Therefore, the output of the second sensor 513 is in the ON state.

In the first state of the first detection device 51, the third sensor 514 faces the second cylindrical surface 511*a* of the second detection object 511. Therefore, the output of the third sensor 514 is in the ON state.

As described above, when the output of the first sensor 512 is in the OFF state, the output of the second sensor 513 is in the ON state, and the output of the third sensor 514 is in the ON state, the first detection device 51 detects that the pair of cylinder connecting pins 454A and 454B is in the out-state.

When the state of the second detection device 52 transitions from the neutral state to the first state, the output of the sensor 521 changes according to the phase of the detection object 520. Here, the sensor 521 is configured to output a predetermined voltage (hereinafter, the voltage is referred to as a first voltage) corresponding to the first state.

Therefore, when the second detection device 52 transitions from the neutral state to the first state, the output of the sensor 521 changes from the neutral voltage to the first voltage. When the output of the sensor 521 changes from the neutral voltage to the first voltage, the second detection device 52 detects that the pair of cylinder connecting pins 454A and 454B transitions from the in-state to the out-state.

Then, when the pair of cylinder connecting pins 454A and 454B is in the out-state, the second detection device 52 is in the first state. In the first state of the second detection device 52, the output of the sensor 521 is the first voltage. When the output of the sensor 521 reaches the first voltage, the second detection device 52 detects that the pair of cylinder connecting pins 454A and 454B is in the out-state.

When the cylinder connecting pins 454A and 454B are in the out-state, as illustrated in FIG. 2E, the distal ends of the pair of cylinder connecting pins 454A and 454B are disengaged from the pair of cylinder pin receiving portions 141*a* of the distal end boom 141. When the first detection device 51 and/or the second detection device 52 detect that the pair of cylinder connecting pins 454A and 454B is in the out-state, the control unit turns off the electric motor 41 while turning on the brake mechanism 42 to stop the operation of the cylinder connecting mechanism 45.

The state of each member in the state illustrated in FIG. 2E is as follows (see $T_6$ in FIG. 12).

Brake mechanism 42: ON

Electric motor 41: OFF

Cylinder connecting mechanism 45: REDUCED STATE

Boom connecting mechanism 46: EXPANDED STATE

Cylinder connecting pins 454A and 454B: OUT-STATE

Boom connecting pin 144*a*: IN-STATE

In the first state (see FIG. 13) of the first detection device 51 and the second detection device 52, the cylinder connecting pins 454A and 454B are in the out-state, and the boom connecting pin 144*a* is in the in-state. The combination of the states is a third set of combinations of states of the cylinder connecting pin and the boom connecting pin.

Thereafter, although not illustrated, when pressure oil is supplied to the hydraulic chamber on the contraction side in the telescopic cylinder 3 of the actuator 2, the cylinder member 32 is displaced in the contracting direction (right side in FIGS. 2A to 2E). At this time, since the distal end boom 141 and the cylinder member 32 are in the disconnected state, the cylinder member 32 is independently displaced in the contracting direction. When the middle boom 142 is expanded, the operations in FIGS. 2A to 2E are performed on the middle boom 142.

Next, abnormality detection control executed by the computer (control unit 530) mounted on the mobile crane 1 of this embodiment will be described. Hereinafter, the control of the telescopic movement of the telescopic boom 14 performed by the control unit 530 is referred to as telescopic movement control. The abnormality detection control is basically performed in the telescopic movement control.

The abnormality detection control includes a process in which the control unit 530 detects that an abnormality has occurred in the main-detection device (second detection device 52) and the sub-detection device (first detection device 51) on the basis of detection results of the main-detection device (second detection device 52) and the sub-detection device (first detection device 51). In addition, the abnormality detection control includes a process in which the control unit 530 specifies a detection device (hereinafter, referred to as an abnormal detection device) in which an abnormality has occurred on the basis of detection results of the main-detection device (second detection device 52) and the sub-detection device (first detection device 51).

Figure 14:
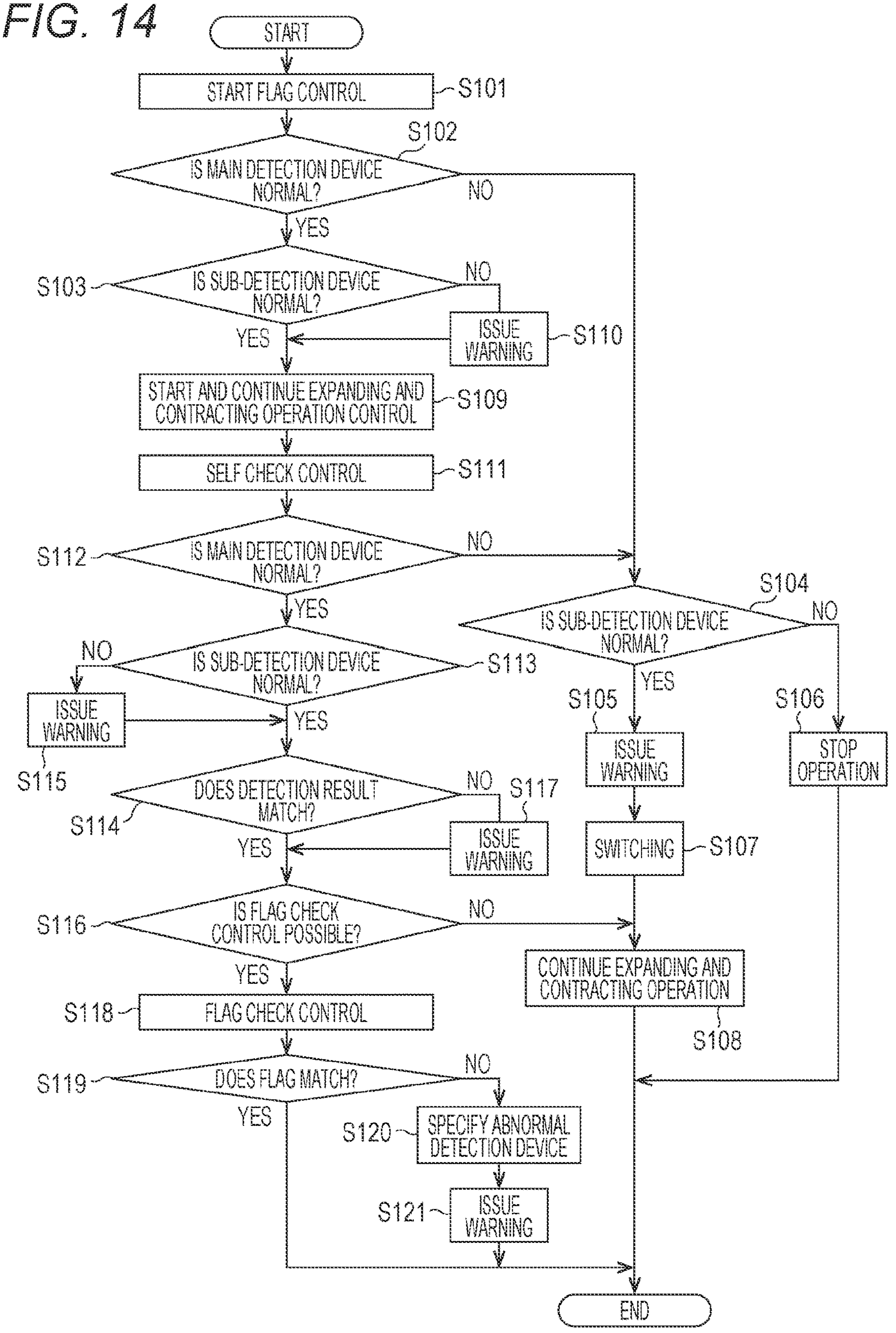
FIG. 14 is a flowchart illustrating an example of a process of abnormality detection control.

FIG. 14 is a flowchart illustrating an example of the abnormality detection control. The order of the control process of the abnormality detection control is not limited to the order illustrated in the flowchart illustrated in FIG. 14. The control processes illustrated in the flowchart of FIG. 14 may be performed in an appropriate order and at an appropriate timing within a range not technically contradictory. Unless otherwise specified, the subject of the abnormality detection control is the control unit 530.

First, in step S101 of FIG. 14, the control unit 530 starts flag control.

Here, the flag control will be described. In the flag control, the control unit 530 controls ON/OFF of the first flag indicating whether or not the main-detection device (second detection device 52) has been able to detect the combination of the states of the cylinder connecting pin and the boom connecting pin.

In the flag control, the control unit 530 controls ON/OFF of the second flag indicating whether or not the sub-detection device (first detection device 51) has been able to detect the combination of the states of the cylinder connecting pin and the boom connecting pin.

The combination of the states of the cylinder connecting pin and the boom connecting pin includes a first set (corresponding to combination No. 3 in FIG. 15) in which the cylinder connecting pin is the in-state and the boom connecting pin is the in-state, a second set (corresponding to combination No. 5 in FIG. 15) in which the cylinder connecting pin is the in-state and the boom connecting pin is the out-state, and a third set (corresponding to combination No. 1 in FIG. 15) in which the cylinder connecting pin is the out-state and the boom connecting pin is the in-state. Hereinafter, a set constituting a combination of the states of the cylinder connecting pin and the boom connecting pin is simply referred to as a first set, a second set, and a third set.

The first flag includes a flag element (corresponding to check flag No. 3 in FIG. 15) corresponding to the first set, a flag element (corresponding to check flag No. 5 in FIG. 15) corresponding to the second set, and a flag element (corresponding to check flag No. 1 in FIG. 15) corresponding to the third set. Each flag element of the first flag corresponds to an example of the first flag element.

In the telescopic movement control or the self-check control to be described later, when the second detection device 52 detects that the cylinder connecting pin is in the in-state and the boom connecting pin is in the in-state after the cylinder connecting pin is in the in-state and the boom connecting pin is in the in-state, the control unit 530 turns on the flag element corresponding to the first set in the first flag.

In addition, in the telescopic movement control or the self-check control described later, when the second detection device 52 detects that the cylinder connecting pin is in the in-state and the boom connecting pin is in the out-state after the cylinder connecting pin is in the in-state and the boom connecting pin is in the out-state, the control unit 530 turns on the flag element corresponding to the second set in the first flag.

In addition, in the telescopic movement control or the self-check control described later, when the second detection device 52 detects that the cylinder connecting pin is in the out-state and the boom connecting pin is in the in-state after the cylinder connecting pin is in the out-state and the boom connecting pin is in the in-state, the control unit 530 turns on the flag element corresponding to the third set in the first flag.

The second flag includes a flag element (corresponding to check flag No. 3 in FIG. 15) corresponding to the first set, a flag element (corresponding to check flag No. 5 in FIG. 15) corresponding to the second set, and a flag element (corresponding to check flag No. 1 in FIG. 15) corresponding to the third set. Each flag element of the second flag corresponds to an example of the second flag element.

In the telescopic movement control or the self-check control to be described later, when the first detection device 51 detects that the cylinder connecting pin is in the in-state and the boom connecting pin is in the in-state after the cylinder connecting pin is in the in-state and the boom connecting pin is in the in-state, the control unit 530 turns on the flag element corresponding to the first set in the second flag.

In addition, in the telescopic movement control or the self-check control to be described later, when the first detection device 51 detects that the cylinder connecting pin is in the in-state and the boom connecting pin is in the out-state after the cylinder connecting pin is in the in-state and the boom connecting pin is in the out-state, the control unit 530 turns on the flag element corresponding to the second set in the second flag.

In the telescopic movement control or the self-check control to be described later, when the first detection device 51 detects that the cylinder connecting pin is in the out-state and the boom connecting pin is in the in-state after the cylinder connecting pin is in the out-state and the boom connecting pin is in the in-state, the control unit 530 turns on the flag element corresponding to the third set in the second flag.

When all the flag elements of the first flag are turned on, the control unit 530 performs flag check control to be described later, and then resets (turns off) all the flag elements of the first flag. Then, the flag control is repeated.

When all the flag elements of the second flag are turned on, the control unit 530 performs flag check control to be described later, and then resets (turns off) all the flag elements of the second flag. Then, the flag control is repeated.

The ON/OFF control of the first flag and the second flag in the telescopic movement control or the self-check control described later as described above is the flag control. Further, the control unit 530 may cause the display unit to display, at an appropriate timing, an image indicating the states (a state of the first flag may be used) of the cylinder connecting pin and the boom connecting pin corresponding to the detection result of the main-detection device (second detection device 52) and an image indicating the states (the second flag may be set) of the cylinder connecting pin and the boom connecting pin corresponding to the detection result of the sub-detection device (first detection device 51).

Next, in step S102, the control unit 530 determines whether or not the main-detection device (second detection device 52) is normal.

In the telescopic movement control or the self-check control to be described later, the control unit 530 determines whether or not the output (in this embodiment, the voltage value) of the main-detection device (second detection device 52) is in the normal range (see FIG. 15). The range of the output of the main-detection device (second detection device 52) in the normal state corresponds to an example of the first predetermined condition.

When the output of the main-detection device (second detection device 52) is within the normal range, the control unit 530 determines that the main-detection device (second detection device 52) is normal. On the other hand, when the output of the main-detection device (second detection device 52) is out of the normal range, the control unit 530 determines that the second detection device 52 is not normal.

When it is determined in step S102 that the main-detection device (second detection device 52) is normal, the control unit 530 advances the control process to step S103. On the other hand, when it is determined in step S102 that the main-detection device (second detection device 52) is not normal, the control unit 530 advances the control process to step S104.

Next, the control process after it is determined in step S102 that the main-detection device (second detection device 52) is not normal will be described.

In step S104, the control unit 530 determines whether or not the sub-detection device (first detection device 51) is normal.

A first example of a method of determining whether or not the sub-detection device (first detection device 51) is normal will be described. The method of the first example is performed when the control process transitions from step S102 to step S104.

In the telescopic movement control or the self-check control to be described later, the control unit 530 determines whether or not the combination of the outputs of the sub-detection devices (first detection devices 51) is a normal combination (see FIG. 15). The combination corresponds to an example of the second predetermined condition. The appropriate combination is a combination of outputs (ON/OFF) of the first sensor 512, the second sensor 513, and the third sensor 514 of the sub-detection device (first detection device 51) in FIG. 15.

When the combination of the outputs of the sub-detection devices (first detection devices 51) is a normal combination, the control unit 530 determines that the sub-detection device (first detection device 51) is normal. On the other hand, when the output of the sub-detection device (first detection device 51) is not a normal combination, the control unit 530 determines that the sub-detection device (first detection device 51) is not normal.

A second example of a method of determining whether or not the sub-detection device (first detection device 51) is normal will be described. The method of the second example is performed when the control process transitions from step S112 to step S104 described later.

In the determination method of the second example, the control unit 530 determines whether or not the sub-detection device (first detection device 51) is normal on the basis of the result of the self-check control performed in step S111 described later. Depending on the occurrence status of the abnormality, the occurrence of the abnormality of the sub-detection device (first detection device 51) may not be detected by the self-check control. However, in the flag check control described later, the device in which the abnormality has occurred can be specified.

When it is determined in step S104 that the sub-detection device (first detection device 51) is normal, the control unit 530 advances the control process to step S105. On the other hand, when determining that the sub-detection device (first detection device 51) is not normal in step S104 of FIG. 14, the control unit 530 advances the control process to step S106.

In step S105, the control unit 530 issues a warning. The warning includes information indicating that an abnormality has occurred in the main-detection device (second detection device 52). The warning may be issued by the display on the display unit or the generation of the warning sound. Thereafter, the control unit 530 advances the control process to step S107.

In step S107, the control unit 530 switches the detection device used for the telescopic movement control from the main-detection device (second detection device 52) to the sub-detection device (first detection device 51). Then, the control unit 530 advances the control process to step S108.

In step S108, the control unit 530 continues the telescopic movement control on the basis of the detection result of the sub-detection device (first detection device 51). Further, the control unit 530 may end the telescopic movement control at an appropriate timing.

After determining that the sub-detection device (first detection device 51) is not normal in step S104, the control unit 530 stops the telescopic movement of the telescopic boom 14 in step S106. Then, the control unit 530 ends the telescopic movement control and the abnormality detection control.

After determining that the main-detection device (second detection device 52) is normal in step S102, the control unit 530 determines whether or not the sub-detection device (first detection device 51) is normal in step S103. The determination method performed by the control unit 530 in step S103 is similar to the determination method of the first example performed by the control unit 530 in step S104.

When the sub-detection device (first detection device 51) is normal in step S103, the control unit 530 advances the control process to step S109. On the other hand, when the sub-detection device (first detection device 51) is not normal in step S103, the control unit 530 advances the control process to step S110.

In step S110, the control unit 530 issues a warning. The warning includes information indicating that an abnormality has occurred in the sub-detection device. The warning may be displayed on the display unit or may be issued by generating a warning sound. Thereafter, the control unit 530 advances the control process to step S109. The reason why the control process advances to step S109 is that since the main-detection device (second detection device 52) is normal, the control unit 530 can start or continue the telescopic movement control on the basis of the detection result of the main-detection device (second detection device 52).

Next, in step S109, the control unit 530 starts the telescopic movement control on the basis of the detection result of the main-detection device (second detection device 52). When the telescopic movement control based on the detection result of the main-detection device (second detection device 52) has already been started, the telescopic movement control based on the detection result of the main-detection device (second detection device 52) is continued. Then, the control unit 530 advances the control process to step S111.

Next, in step S111 of FIG. 14, the control unit 530 performs self-check control.

Here, the self-check control will be described. The self-check control is performed by the control unit 530 when the telescopic boom 14 corresponds to a predetermined state.

Specifically, the predetermined state means a non-load state in which the load of the boom element does not act on the boom connecting pin. In addition, the predetermined state may mean a telescopic cylinder total contraction state in which the telescopic cylinder 3 is in a total contraction state. In the non-load state and the cylinder total contraction state, since the load of the boom element does not act on the cylinder connecting pin and the boom connecting pin, the cylinder connecting pin and the boom connecting pin can be stably moved. Further, the non-load state and the cylinder total contraction state occur even before the telescopic boom starts the telescopic movement, and also occur even after the telescopic boom starts the telescopic movement. The predetermined state is not limited to the above example, and the control unit may perform the self-check control at an appropriate timing.

In the self-check control, the control unit 530 causes at least the boom connecting pin to transition from the in-state to the out-state or from the out-state to the in-state. Further, the control unit 530 may cause the cylinder connecting pin to transition from the in-state to the out-state or from the out-state to the in-state in the self-check control.

By performing the self-check control, the flag control described above can be performed without expanding and contraction of the telescopic boom 14 in the predetermined state.

In the self-check control, the control unit 530 preferably controls the states of the cylinder connecting pin and the boom connecting pin so that all the flag elements of the first flag and the second flag are turned on. However, the cylinder connecting pin and the boom connecting pin may be controlled such that only some flag elements of the first flag and the second flag are turned on according to the state of the telescopic boom 14.

The control unit 530 can determine whether or not an abnormality has occurred in the main-detection device (second detection device 52) and the sub-detection device (first detection device 51) by comparing the combination of the states of the cylinder connecting pin and the boom connecting pin realized by the self-check control with the states of the first flag and the second flag. In addition, when an abnormality has occurred in the main-detection device (second detection device 52) and/or the sub-detection device (first detection device 51), the control unit 530 can specify the detection device in which the abnormality has occurred on the basis of the result of the above-described comparison.

Hereinafter, a specific example of the self-check control will be described with reference to FIGS. 2A and 15. The state of the telescopic boom 14 illustrated in FIG. 2A is a non-load state in which the load of the boom element does not act on the boom connecting pin, and is a telescopic cylinder total contraction state in which the telescopic cylinder 3 is in the total contraction state. Therefore, the state of the telescopic boom 14 illustrated in FIG. 2A corresponds to the above-described predetermined state.

In the state illustrated in FIG. 2A, the cylinder connecting pin is in the in-state, and the boom connecting pin (specifically, boom connecting pin 144*a*) is in the in-state. When the main-detection device (second detection device 52) and the sub-detection device (first detection device 51) operate normally in this state, the flag element corresponding to the first set in the first flag is turned on and the flag element corresponding to the first set in the second flag is turned on by the above-described flag control.

Next, the control unit 530 transitions the state of the boom connecting pin (specifically, boom connecting pin 144*a*) from the in-state to the out-state by the self-check control. In this state, the cylinder connecting pin is the in-state and the boom connecting pin (specifically, boom connecting pin 144*a*) is the out-state. Therefore, when the main-detection device (second detection device 52) and the sub-detection device (first detection device 51) operate normally, the flag element corresponding to the second set in the first flag is turned on and the flag element corresponding to the second set in the second flag is turned on by the above-described flag control. Thereafter, the boom connecting pin (specifically, boom connecting pin 144*a*) is transitioned from the out-state to the in-state, and is returned to the state illustrated in FIG. 2A.

When the main-detection device (second detection device 52) and the sub-detection device (first detection device 51) operate normally by the self-check control as described above, the states of the first flag and the second flag are as follows.

[State of First Flag and Second Flag in Normal State]

Flag element corresponding to first set in first flag: ON
Flag element corresponding to first set in second flag: ON
Flag element corresponding to second set in first flag: ON Flag element corresponding to second set in second flag: ON However, when the main-detection device (second detection device 52) or the sub-detection device (first detection device 51) does not operate normally (that is, when an abnormality has occurred), the states of the first flag and the second flag are different from the states of the normal first flag and second flag described above. As a result, the control unit 530 can detect that an abnormality has occurred in the main-detection device (second detection device 52) or the sub-detection device (first detection device 51). In addition, the control unit 530 can specify a detection device in which the state of the flag is different from the states of the above-described normal first flag and second flag as the detection device in which the abnormality has occurred.

In the above example, the state of the flag corresponding to the first set and the second set is known, but the state of the flag corresponding to the third set (cylinder connecting pin out-state and boom connecting pin in-state) is not known. Therefore, depending on the occurrence status of the abnormality, the occurrence of the abnormality in the detection device cannot be detected in some cases.

Therefore, in addition to the self-check control described above, the state of the flag element corresponding to the third set in the first flag and the state of the flag element corresponding to the third set in the second flag can be confirmed by transitioning the cylinder connecting pin from the in-state to the out-state in the state illustrated in FIG. 2A. By adding such control, it is possible to detect that an abnormality has occurred in the detection device regardless of the occurrence status of the abnormality, and to specify the detection device in which the abnormality has occurred.

By performing the self-check control as described above, it is possible to quickly and stably detect the abnormality of the detection device. After performing the self-check control, the control unit 530 advances the control process to step S112.

In step S112 of FIG. 14, the control unit 530 determines whether or not the main-detection device (second detection device 52) is normal on the basis of the result of the self-check described above.

When it is determined in step S112 that the main-detection device (second detection device 52) is normal, the control unit 530 advances the control process to step S113. On the other hand, when it is determined in step S112 that the main-detection device (second detection device 52) is not normal, the control unit 530 advances the control process to step S104. Further, the control process in step S104 in the case of advancing from step S112 to step S104 is as described above.

Next, in step S113, the control unit 530 determines whether or not the sub-detection device (first detection device 51) is normal on the basis of the result of the self-check control performed in step S111. As described above, depending on the occurrence status of the abnormality, the occurrence of the abnormality in the sub-detection device (first detection device 51) may not be detected in some cases. However, even when the occurrence of the abnormality cannot be detected by the self-check control, the occurrence of the abnormality can be detected by the flag check control described later.

When it is determined in step S113 that the sub-detection device (first detection device 51) is normal, the control unit 530 advances the control process to step S114. On the other hand, when determining that the sub-detection device (first detection device 51) is not normal in step S113, the control unit 530 advances the control process to step S115.

In step S115, the control unit 530 issues a warning. The warning includes information indicating that an abnormality has occurred in the sub-detection device (first detection device 51). The warning may be displayed on the display unit or may be issued by generating a warning sound. Thereafter, the control unit 530 advances the control process to step S114. The reason why the control process advances to step S114 is that since the main-detection device (second detection device 52) is normal, the control unit 530 can continue the telescopic movement control on the basis of the detection result of the main-detection device (second detection device 52).

Next, in step S114, the control unit 530 determines whether or not the detection result of the main-detection device (second detection device 52) and the detection result of the sub-detection device (first detection device 51) match.

When the detection result of the main-detection device (second detection device 52) and the detection result of the sub-detection device (first detection device 51) do not match, the control unit 530 determines that an abnormality has occurred in at least one of the main-detection device (second detection device 52) and the sub-detection device (first detection device 51). Then, the control unit 530 advances the control process to step S117.

On the other hand, when the detection result of the main-detection device (second detection device 52) matches the detection result of the sub-detection device (first detection device 51), the control unit 530 determines that no abnormality has occurred (is normal) in the main-detection device (second detection device 52) and the sub-detection device (first detection device 51). Then, the control unit 530 advances the control process to step S116.

In step S117, the control unit 530 issues a warning. The warning includes information indicating that an abnormality has occurred in at least one of the main-detection device (second detection device 52) and the sub-detection device (first detection device 51). The warning may be issued by the display on the display unit or the generation of the warning sound. Then, the control unit 530 advances the control process to step S116. The reason why the control process advances to step S116 is to specify the detection device in which the abnormality has occurred by flag check control described later.

In step S116, the control unit 530 determines whether or not it corresponds to a state in which the flag check control can be performed.

When all the flag elements of at least one flag of the first flag and the second flag are turned on, the control unit 530 determines that the state corresponds to a state where the flag check control can be performed. Then, the control unit 530 advances the control process to step S118. Further, the control process after step S116 may be performed at an appropriate timing.

On the other hand, when there is no flag in which all the flag elements are in the ON state in the first flag and the second flag, the control unit 530 determines that the state does not correspond to a state in which the flag check control can be performed. Then, the control unit 530 advances the control process to step S108. The operation of the control unit 530 in step S108 is as described above.

In step S118, the control unit 530 performs flag check control. In the flag check control, the control unit 530 compares the flag element of the first flag with the flag element of the second flag. Then, the control unit 530 advances the control process to step S119.

In step S119, the control unit 530 determines whether or not the flag element of the first flag matches the flag element of the second flag.

When the flag element of the first flag and the flag element of the second flag match, the control unit 530 ends the control process and then repeats the abnormality detection control from step S102. Since it is determined in step S116 that all the flag elements of at least one flag of the first flag and the second flag are turned on, matching between the flag elements of the first flag and the second flag means that all the flag elements of the first flag and the second flag are turned on. This means that the main-detection device (second detection device 52) and the sub-detection device (first detection device 51) can normally detect the combination of the states of the cylinder connecting pin and the boom connecting pin.

On the other hand, when the flag element of the first flag and the flag element of the second flag do not match, the control unit 530 advances the control process to step S120. Since it is determined in step S116 that all the flag elements of at least one flag of the first flag and the second flag are turned on, the fact that the flag elements of the first flag and the flag elements of the second flag do not match means that all the flag elements of the other flag of the first flag and the second flag are not ON (that is, the flag element of the other flag includes OFF). This means that the other detection device described above cannot detect the combination of the states of the cylinder connecting pin and the boom connecting pin. That is, it means that an abnormality has occurred in the other detection device described above.

In step S120, the control unit 530 specifies an abnormal detection device which is a detection device in which an abnormality has occurred. Specifically, first, a flag in which all flag elements are not ON (that is, the flag includes a flag in which the flag element is OFF) is specified from the first flag and the second flag. Then, the abnormal detection device is specified on the basis of the specified flag.

For example, when all the flag elements of the first flag are not ON, the control unit 530 specifies the main-detection device (second detection device 52) as the abnormal detection device. On the other hand, when all the flag elements of the second flag are not ON, the control unit 530 specifies the sub-detection device (first detection device 51) as the abnormal detection device. Then, the control unit 530 advances the control process to step S121.

In step S121, the control unit 530 issues a warning. The warning includes information indicating the abnormal detection device. The warning may be issued by the display on the display unit or the generation of the warning sound. Thereafter, the control unit 530 ends the control process.

After step S121, when the abnormal detection device is the main-detection device (second detection device 52), the control unit 530 may switch the detection device used for the telescopic movement control from the main-detection device (second detection device 52) to the sub-detection device (first detection device 51) and continue the telescopic movement control. In this case, since the abnormal detection device has been specified, the control unit 530 may continue or stop the above-described abnormality detection control. When the abnormality detection control is continued, the control unit 530 repeats the abnormality detection control from step S102.

After step S121, when the abnormal detection device is the sub-detection device (first detection device 51), the control unit 530 may continue the telescopic movement control. Also in this case, since the abnormal detection device can be specified, the control unit 530 may continue or stop the above-described abnormality detection control. When the abnormality detection control is continued, the control unit 530 repeats the abnormality detection control from step S102.

<Operation and Effect of Embodiment>

In the mobile crane 1 of this embodiment having the above configuration, the position of the pair of cylinder connecting pins 454A and 454B and the boom connecting pins 144*a* and 144*b* is detected by the above-described position information detection device 5. Therefore, the telescopic movement of the telescopic boom 14 can be accurately controlled.

In particular, in the case of this embodiment, the position information detection device 5 includes the first detection device 51 and the second detection device 52 having different detection methods. Then, at the normal time, the second detection device 52 detects the information on the position, and when the second detection device 52 fails, the first detection device 51 detects the information on the position. Therefore, even when any one of the first detection device 51 and the second detection device 52 fails, the positions of the pair of cylinder connecting pins 454A and 454B and the boom connecting pins 144*a* and 144*b* can be detected.

In addition, the control unit 530 can perform the failure determination of the detection device on the basis of the detection values of the first detection device 51 and the second detection device 52 while detecting the information regarding the positions of the pair of cylinder connecting pins 454A and 454B and the pair of boom connecting pins 144*a* and 144*b* on the basis of the detection value of the second detection device 52 in the normal control. As a result, the control unit 530 can quickly detect that a failure has occurred in at least one of the first detection device 51 and the second detection device 52.

In addition, in the case of this embodiment, since the first detection device 51 and the second detection device 52 having different detection methods from each other are included, it is possible to suppress both detection devices from being affected by noise at the same time. If the detection methods of the first detection device 51 and the second detection device 52 are the same, there is a possibility that the first detection device 51 and the second detection device 52 are simultaneously affected by noise. On the other hand, in the case of this embodiment, since the detection method of the first detection device 51 is different from the detection method of the second detection device 52, even when one detection device is affected by noise, the other detection device is less likely to be affected by the same noise. As a result, in the case of this embodiment, it is possible to suppress a state in which the first detection device 51 and the second detection device 52 cannot simultaneously detect the positions of the pair of cylinder connecting pins 454A and 454B and the boom connecting pins 144*a* and 144*b* (a state in which detection accuracy is low) due to the influence of noise.

In the case of this embodiment, it is possible to detect the occurrence of abnormality in the main-detection device (second detection device 52) and the sub-detection device (first detection device 51) by the above-described abnormality detection control. In particular, in the case of this embodiment, the detection device in which the abnormality has occurred can be specified by the self-check control or the flag check control described above. As a result, the telescopic movement control can be performed more safely.

APPENDIX

The technical idea disclosed in the specification and the drawings includes an invention obtained by arbitrarily combining various configurations described in the above-described embodiments. In particular, the technical idea disclosed in the specification and the drawings includes an invention obtained by applying various configurations disclosed in the specification and the drawings to the basic configuration in any combination.

INDUSTRIAL APPLICABILITY

The present invention can be applied not only to a crane but also to various work machines (for example, a high-place work vehicle) including a telescopic boom.

REFERENCE SIGNS LIST

1 Mobile crane
10 Traveling body
12 Turning table
14 Telescopic boom
141 Distal end boom
141*a* Cylinder pin receiving portion
141*b* Boom pin receiving portion
142 Middle boom
142*a* Cylinder pin receiving portion
142*b* First boom pin receiving portion
142*c* Second boom pin receiving portion
142*d* Third boom pin receiving portion
143 Proximal end boom
144*a*, 144*b* Boom connecting pin
144*c* Pin side receiving portion
16 Wire rope
17 Hook
2 Actuator
3 Telescopic cylinder
31 Rod member
32 Cylinder member
4 Pin moving mechanism
40 Trunnion
400 Fixed portion
401 Support hole
41 Electric motor
410 Cover
42 Brake mechanism
43 Transmission mechanism
431 Speed reducer
432 Vertical transmission mechanism
432*a* Upper transmission shaft
432*b* Lower transmission shaft
45 Cylinder connecting mechanism
450 Switch gear
451 First rack bar
452 First gear mechanism
453 Second gear mechanism
454A, 454B Cylinder connecting pin
455 First biasing mechanism
455*a*, 455*b* Coil spring
46 Boom connecting mechanism
461*a*, 461*b* Second rack bar
461*c* Driving rack tooth portion
461g, 461 *h* Locking claw portion
462 Synchronous gear
463 Second biasing mechanism
463*a*, 463*b* Coil spring
5 Position information detection device
50 Support
501 Right side plate
502 Left side plate
503 Rear side plate
504 Right side fixing plate
505 Left side fixing plate
506 Accommodation space
507 Positioning pin
51 First detection device
510 First detection object
510*a* First cylindrical surface
510*b* First flat surface
511 Second detection object
511*a* Second cylindrical surface
511*b* Second flat surface
512 First sensor
513 Second sensor
514 Third sensor
52 Second detection device
520 Detection object
521 Sensor
530 Control unit
54 Cover member

The invention claimed is:

1. A work machine comprising:

a plurality of booms that are telescoped with telescopic cylinders;

a first pin capable of transitioning between an in-state in which the boom and the telescopic cylinder are connected and an out-state in which a connection of the boom and the telescopic cylinder is released;

a second pin capable of transitioning between an in-state in which adjacent booms are connected and an out-state in which a connection of the adjacent booms is released;

a main-detection device and a sub-detection device that are able to detect a combination of the states of the first pin and the second pin; and a control unit that controls a telescopic movement of the boom on a basis of a detection result of the main-detection device, wherein the control unit controls ON/OFF of a first flag indicating whether or not the main-detection device was able to detect the combination and ON/OFF of a second flag indicating whether or not the sub-detection device was able to detect the combination during the telescopic movement of the boom and detects that an abnormality has occurred in the main-detection device and the sub-detection device on a basis of the first flag and the second flag, wherein the control unit compares the first flag with the second flag, and specifies an abnormal detection device in which the abnormality has occurred among the main-detection device and the sub-detection device, wherein the combination of the states of the first pin and the second pin includes a first set in which the first pin is the in-state and the second pin is the in-state, a second set in which the first pin is the in-state and the second pin is the out-state, and a third set in which the first pin is the out-state and the second pin is the in-state, wherein the first flag includes three first flag elements corresponding to the first set, the second set, and the third set, wherein the second flag includes three second flag elements corresponding to the first set, the second set, and the third set, and wherein when all the flag elements of one flag of the first flag and the second flag are turned on, the control unit compares the first flag with the second flag to specify the abnormal detection device.

2. The work machine according to claim 1, wherein in the comparison, the control unit determines that no abnormality has occurred when all the flag elements of the other flag of the first flag and the second flag are turned on and determines that the abnormality has occurred in the detection device corresponding to the other flag of the first flag and the second flag when all the flag elements of the other flag of the first flag and the second flag are not turned on.

3. The work machine according to claim 1, wherein the control unit performs self-check control to transition a state of the first pin and/or the second pin without telescoping the boom in a predetermined state, controls ON/OFF of the first flag and the second flag during the self-check control, and specifies the abnormal detection device on the basis of the first flag and the second flag.

4. The work machine according to claim 3, wherein the predetermined state includes a non-load state in which a load of the boom does not act on the second pin or a telescopic cylinder total contraction state in which the telescopic cylinder is in a total contraction state.

5. The work machine according to claim 1, wherein the control unit detects that the abnormality has occurred in the main-detection device when an output of the main-detection device does not satisfy a first predetermined condition, detects that the abnormality has occurred in the sub-detection device when an output of the sub-detection device does not satisfy a second predetermined condition, controls the telescopic movement of the boom on a basis of a detection result of the sub-detection device when the abnormality has occurred in the main-detection device and no abnormality has occurred in the sub-detection device, and stops a control of the telescopic movement of the boom when the abnormality has occurred in the main-detection device and the sub-detection device.

6. The work machine according to claim 1, wherein when a detection result of the main-detection device and a detection result of the sub-detection device do not match, the control unit detects that the abnormality has occurred in any one of the main-detection device and the sub-detection device.

7. The work machine according to claim 1, wherein the main-detection device and the sub-detection device detect the combination by different detection methods.

8. The work machine according to claim 1, wherein the main-detection device includes a potentiometer, and detects the combination on a basis of a voltage value that is an output of the potentiometer, and wherein the sub-detection device includes three proximity sensors, and detects the combination on a basis of a combination of detection values of the three proximity sensors.

9. The work machine according to claim 1, wherein the control unit causes a display unit to display an image indicating states of the first pin and the second pin corresponding to a detection result of the main-detection device and an image indicating states of the first pin and the second pin corresponding to a detection result of the sub-detection device.

10. A work machine comprising:

a plurality of booms that are telescoped with telescopic cylinders;

a first pin capable of transitioning between an in-state in which the boom and the telescopic cylinder are connected and an out-state in which a connection of the boom and the telescopic cylinder is released;

a second pin capable of transitioning between an in-state in which adjacent booms are connected and an out-state in which a connection of the adjacent booms is released;

a main-detection device and a sub-detection device that are able to detect a combination of the states of the first pin and the second pin; and a control unit that controls a telescopic movement of the boom on a basis of a detection result of the main-detection device, wherein the control unit controls ON/OFF of a first flag indicating whether or not the main-detection device was able to detect the combination and ON/OFF of a second flag indicating whether or not the sub-detection device was able to detect the combination during the telescopic movement of the boom and detects that an abnormality has occurred in the main-detection device and the sub-detection device on a basis of the first flag and the second flag, wherein the control unit compares the first flag with the second flag, and specifies an abnormal detection device in which the abnormality has occurred among the main-detection device and the sub-detection device, and wherein the control unit performs self-check control to transition a state of the first pin and/or the second pin without telescoping the boom in a predetermined state, controls ON/OFF of the first flag and the second flag during the self-check control, and specifies the abnormal detection device on the basis of the first flag and the second flag.

* * * * *